(12) United States Patent
Kim et al.

(10) Patent No.: US 12,064,057 B2
(45) Date of Patent: Aug. 20, 2024

(54) BLENDER AND BLENDER CONTAINER

(71) Applicant: LG ELECTRONICS INC., Seoul (KR)

(72) Inventors: Mingyu Kim, Seoul (KR); Jinhae Ye, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 349 days.

(21) Appl. No.: 17/018,977

(22) Filed: Sep. 11, 2020

(65) Prior Publication Data

US 2021/0093125 A1 Apr. 1, 2021

(30) Foreign Application Priority Data

Sep. 27, 2019 (KR) .......................... 10-2019-0119696

(51) Int. Cl.
*A47J 43/046* (2006.01)
*A47J 43/07* (2006.01)
*A47J 43/08* (2006.01)

(52) U.S. Cl.
CPC ......... *A47J 43/046* (2013.01); *A47J 43/0716* (2013.01); *A47J 43/0722* (2013.01); *A47J 43/0727* (2013.01); *A47J 43/085* (2013.01)

(58) Field of Classification Search
CPC .. A47J 43/046; A47J 43/0716; A47J 43/0722; A47J 43/0727
USPC .................................. 241/100; 220/752, 755
See application file for complete search history.

(56) References Cited

U.S. PATENT DOCUMENTS

| 5,052,593 | A | * | 10/1991 | Grome | A21C 11/18 222/333 |
|---|---|---|---|---|---|
| 8,529,120 | B2 | | 9/2013 | Ulanski | |
| 2006/0176765 | A1 | * | 8/2006 | Pryor | A47J 43/046 366/205 |
| 2008/0219089 | A1 | * | 9/2008 | Sandford | A47J 43/046 366/197 |
| 2008/0298172 | A1 | * | 12/2008 | Krasznai | A47J 43/0722 366/314 |

(Continued)

FOREIGN PATENT DOCUMENTS

| CN | 104957983 A | 10/2015 |
|---|---|---|
| CN | 105496190 A | 4/2016 |

(Continued)

OTHER PUBLICATIONS

Silicone Resin—an overview _ ScienceDirect Topics, 2012 (https://www.sciencedirect.com/topics/earth-and-planetary-sciences/silicone-resin; site accessed Nov. 9, 2022) (Year: 2012).*

(Continued)

*Primary Examiner* — Christopher L Templeton
*Assistant Examiner* — Fred C Hammers
(74) *Attorney, Agent, or Firm* — Bryan Cave Leighton Paisner LLP

(57) ABSTRACT

A blender includes a main body provided with a motor assembly; a container detachably mountable to the main body and of which an upper surface is opened; a handle having an upper end which is connected to the container and a lower end which is spaced apart from the container, where the handle includes a handle body formed integrally with the container and protruding laterally from an upper end of the container and extending downward from the container.

15 Claims, 18 Drawing Sheets

(56) References Cited

U.S. PATENT DOCUMENTS

| | | | |
|---|---|---|---|
| 2009/0238034 A1 | 9/2009 | Ulanski | |
| 2011/0094062 A1* | 4/2011 | Pasquini | A47J 45/071 16/430 |
| 2013/0215707 A1 | 8/2013 | Fouquet et al. | |
| 2015/0258512 A1* | 9/2015 | Haney | A47J 43/0716 366/205 |
| 2015/0258514 A1* | 9/2015 | Boozer | A47J 43/0727 366/142 |
| 2016/0174771 A1* | 6/2016 | Benoit | A47J 44/02 99/348 |
| 2016/0256003 A1* | 9/2016 | Altenritter | A47J 43/0716 |
| 2018/0310769 A1 | 11/2018 | Kim | |
| 2022/0192426 A1* | 6/2022 | Kozlowski | A47J 43/046 |

FOREIGN PATENT DOCUMENTS

| | | | |
|---|---|---|---|
| CN | 106308305 A | 1/2017 | |
| CN | 207152502 U | 3/2018 | |
| CN | 208388443 U | 1/2019 | |
| CN | 208910318 U | 5/2019 | |
| EP | 2316318 A1 | 5/2011 | |
| EP | 2429359 B1 | 4/2014 | |
| KR | 100738349 B1 | 7/2007 | |
| KR | 1020190086424 A | 7/2019 | |
| WO | 03089142 A1 | 10/2003 | |
| WO | 2006084055 A2 | 8/2006 | |
| WO | 2014071994 A1 | 5/2014 | |

OTHER PUBLICATIONS

Friction and wear of polymers, Zeus whitepaper (2005) (http://www.appstate.edu/~clementsjs/polymerproperties/$p$lastics_$f$riction$5f$w$ear.pdf; sire accessed Nov. 9, 2022) (Year: 2005).*
The Coefficient of Friction of Silicone _ Articles _ Jehbco Silicones (The Coefficient of Friction of Silicone _ Articles _ Jehbco Silicones; site accessed Nov. 9, 2022) (Year: 2017) .*

* cited by examiner

BLENDER AND BLENDER CONTAINER

CROSS-REFERENCE TO RELATED APPLICATIONS

The present application claims priority under 35 U.S.C. 119 and 35 U.S.C. 365 to Korean Patent Application No. 10-2019-0119696, filed on Sep. 27, 2019, which is hereby incorporated by reference in its entirety.

BACKGROUND

The present disclosure relates to a blender and a blender container.

In general, a blender is a household appliance that chops food contained in a container, crushes the food into powder, or makes the food into a state such as a liquid by a blade rotated by an electric motor and is also commonly referred to as a mixer.

In a typical blender, a container is seated on an upper surface of a main body in which a motor is built, and when the container is seated, a blade inside the container is connected to a rotation shaft of the motor to be rotatable. In addition, the user can drive the motor by operating the main body after putting food in the container, and the blade is rotated by the driving of the motor to crush the food.

Such a blender has recently been developed as a large-capacity blender having a large container size, and a blender using a motor rotated at ultra-high speed to be capable of crushing various foods more effectively has been developed.

In addition, the blender may have various manipulation structures to facilitate a grinding operation of various foods.

In the international patent publication WO2014/071994, a recessed connecting portion is formed at the bottom of the container, and a protruding portion is formed at an upper surface of the main body, and thus when the container is seated on the main body, the protruding portion is inserted inside the connecting portion so that the container is securely fixed to the main body. In addition, a handle connecting an upper end and a lower end of the container is formed on the outer surface of the container, and the user can hold the handle and detach and attach the container from and to the main body.

However, in the blender having such a structure, the upper end and the lower end of the handle are both connected to the container, and thus there is an advantage of stably lifting a heavy container when used, but there is a problem in that the outer appearance thereof is not aesthetically pleasing. In addition, in order to use the handle, the hand has to be inserted from the side into the space between the handle and the main body of the container, which may cause inconvenience in use.

In addition, a blender container provided with a handle is disclosed in U.S. Pat. No. 8,529,120, and the handle has a structure that protrudes outward from the upper end of the container and then extends downward, and a structure in which a lower end thereof is spaced apart from the main body is disclosed therein.

In such a structure, there is an advantage in that the user can easily hold and use the handle, but there is a problem in that since the handle is fixed only on one side, the handle is relatively prone to structural damage. In addition, there is a problem in that slip may occur when moving the container while holding the handle.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter.

An object of an embodiment of the present disclosure is to provide a blender and a blender container in which a stable handle coupling structure can be provided in a container that may include a double wall structure. A single wall container may be also applicable in some embodiments disclosed herein.

An object of an embodiment of the present disclosure is to provide a blender and a blender container with improved outer appearance.

An object of an embodiment of the present disclosure is to provide a blender and a blender container which prevent damage while improving the convenience in the use of the handle.

An object of an embodiment of the present disclosure is to provide a blender which has a sense of unity with the main body.

A blender and a blender container according to an embodiment of the present disclosure may include an inner container of which an upper surface is opened, an outer container receiving the inner container; a handle which protrudes outward from the upper end of the container and can be held by a user' hand, in which the handle may include a handle body which is integrally formed with the inner container or the outer container and which protrudes laterally from the upper end of the outer container and extends downward.

A blender and a blender container according to an embodiment of the present disclosure may include an inner container of which an upper surface is opened, an outer container receiving the inner container, and a handle which can be held by the user's hand, in which the handle may include a handle body which protrudes from the upper end of the inner container or the outer container and extends downwardly in a state of being spaced apart from the outer container, a grip member mounted on the handle body, and a deco member which shields the handle body and together with the grip member form an outer appearance.

A blender and a blender container according to an embodiment of the present disclosure may include an inner container of which an upper surface is opened, an outer container receiving the inner container, and a handle which can be held by a user' hand, in which the handle may include a handle body of which the upper end is molded integrally with the inner container or the outer container and extends outside the outer container, and a grip member which is mounted on the handle body and prevents a user's hand from slipping.

A blender according to an embodiment of the present disclosure may include a main body including an outer case made of a metal material and an inner case provided inside the outer case, a container seating portion protruding from the upper surface of the main body, a container detachably mounted on the container seating portion, and a handle which protrudes to the outside of the container, and at least a portion of the handle may include a deco member which is made of a material having the same texture as the outer case to form an outer appearance of the handle.

A blender according to an embodiment of the present disclosure may comprises a main body provided with a motor assembly; a container detachably mounted to the main body and of which an upper surface is opened; a handle extending in a vertical direction at a position away from the container, and having an upper end which is connected to the container and a lower end which is spaced apart from the container, wherein the handle includes a handle body formed integrally with the container and protruding laterally from an upper end of the container.

The handle may further comprise a grip member coupled to the outer surface of the handle body and held by a user's hand, and a deco member covering the outer surface of the handle body which is not covered by the grip member and forming an outer appearance of the handle.

The grip member may be made of rubber or synthetic resin material.

The container may include an inner container forming a space in which food is received, an outer container receiving the inner container and forming an outer appearance.

The outer container may be made of plastic material and is integrally formed together with the handle body by injection molding.

The handle body may include an extension extending from the upper end of the outer container in an outward direction, and a grip portion extending downward from an extended end portion of the extension and held by a user.

The extension may include an extension body forming an extension space therein; and a plurality of extension reinforcement ribs disposed to partition the extension space.

The grip portion may include a grip member mounting portion which is formed at a position facing the outer container and on which the grip member is mounted, and a deco member mounting portion which is formed on an opposite side of the grip member mounting portion and on which the deco member is mounted.

a grip stepped portion which extends from upper ends to lower ends of both sides of the grip portion and may be formed stepwise so that the grip portion is divided into the grip member mounting portion and the deco member mounting portion.

The grip portion may include a deco member mounting portion in which a grip portion space is formed, and a plurality of grip portion reinforcement ribs which partition the grip portion space.

The grip member may include an upper part configured to shield a lower surface of the extension, and a lower part which is bent downward from an end portion of the upper part and configured to shield one side surface of the grip portion.

The lower part may be mounted to be in contact with an end portion of the deco member, and the upper part and the lower part together with the deco member shield the entire circumference of the handle body.

The deco member may include an extension deco of which a lower surface is opened to receive the extension, and a grip portion deco extending downward from the lower end of the extension deco and shields the rest of the grip portion except for the portion which is shielded by the grip member.

The extension deco and the grip portion deco may be molded in a state of being separated from each other and mounted on the extension and the grip portion, respectively.

a stepped portion may be formed at a lower end of the grip member, and wherein the step portion is inserted into a lower end of the grip portion deco to form a constraining portion configured to constrain the grip member.

a deco hole into which a lower end of the grip portion and a lower end of the grip member are inserted in a state of being coupled to each other may be formed on the lower surface of the constraining portion.

The grip member may be formed of a material having a higher frictional force than the outer surface of the container.

The main body may include an outer case which is made of metal material, forms an outer appearance of the main body, and opens a lower surface thereof, and an inner case which is provided inside the outer case and in which the motor assembly is received, and wherein the outer case and the deco member are made of a material having the same texture.

a container seating portion may be provided on an upper surface of the main body and on which the container is seated, and the container seating portion is located at an eccentric position of the main body, and wherein the side end of the handle is positioned on the same extension line as one side surface of the main body.

A blender container according to an embodiment of the present disclosure may comprise an inner container of which an upper surface is opened and which forms a space in which food is received; an outer container receiving the inner container and forming an outer appearance of the inner container; a blade device mounted to penetrate bottoms of the outer container and the inner container and including a plurality of blades configured to crush food by rotation; and a handle extending in a vertical direction at a position away from the outer container and having an upper end which is connected to the outer container and a lower end which is spaced apart from the outer container, wherein the handle includes a handle body formed integrally with the outer container and protruding outward from an upper end of the outer container.

The blender and the blender container according to an embodiment of the present disclosure may have the following effects.

Blender container has a handle of which an upper end is fixed to the container and a lower end is spaced apart from the container. In addition, the handle body constituting the handle may is injection-molded integrally with the inner container or the outer container constituting the container to maintain rigidity. In other words, when holding and lifting the handle, even if the container becomes heavy, the connecting portion between the handle and the container is not damaged, thereby improving the durability thereof.

In addition, the container and the handle body integrally molded with the container may be made of a transparent and smooth surface material such as tritan. In this case, it is not desirable that the handle body itself has a smooth surface so that the user can directly hold the handle body. Thus, the handle body is provided with a grip member having a relatively large frictional force, and thus there is an advantage of preventing the handle body from being slipping when the user holds the handle body.

In addition, there is an advantage that the handle body which is injection-molded integrally with the outer container prevents deformation during injection by an extension reinforcement rib and an extension groove structure, and prevents deformation or breakage due to external loads and impacts.

In addition, the deco member wrapping the outside of the handle is formed of a metal material, and the front end of the deco member maintains a state of being in contact with the outer surface of the container. Therefore, it is possible to provide an additional support structure of the handle by a deco member made of a metal material, and it is possible to expect an effect of preventing the handle from being deformed, maintaining the shape thereof, and preventing damage even when a heavy object is lifted.

In addition, the outer appearance can be made more prominent by allowing the outer appearance to be formed by the deco member on the rest of the handle except for the portion on which the grip member is mounted. At this time, the deco member is made of the same metal material as the outer case of the main body, so that the outer appearance of the blender container and the blender can be more luxurious and have a sense of unity.

In particular, the deco member is configured to include an extension deco for receiving and shielding the extension of the handle and a grip portion deco for receiving the outer surface of the grip portion, and the majority of the outer appearance of the handle is formed by the deco member when viewed from the outside so that there is an advantage that the overall outer appearance looks luxurious and solid.

In addition, in a state where the container is seated on the main body, the container seating portion and the container are positioned at a somewhat eccentric position from the center of the main body, but the outer end of the handle may be disposed on the same extension line as one side surface of the main body, and thus there is an advantage that an overall stable and balanced outer appearance can be provided.

In particular, by having a structure in which the deco member is provided on the handle so as to have the same texture as the outer case forming the outer appearance of the main body, it is possible to harmonize the container and the main body, thereby improving the outer appearance.

In addition, the handle body is integrally injection-molded with the same material as the container so that the strength thereof is greatly improved, and the convenience in use can be further improved by preventing slipping through the grip member.

In addition, the outer appearance of the handle body is covered with the grip member and the deco member, so that the handle body made of the same material as the container is not visible so that the handle can be seen more securely to the user and the outer appearance can be also improved.

In particular, the deco member is made of a metal material, and most of the handles which are visible to the user are made of the deco members, thereby providing a more solid image and a luxurious image to the user.

And, even if the upper ring of a metal material is formed on the upper end of the container, the handle may be seen as being integrally extended with the upper ring by the deco member, thereby providing a more solid and luxurious appearance.

DETAILED DESCRIPTION

Figure 1:
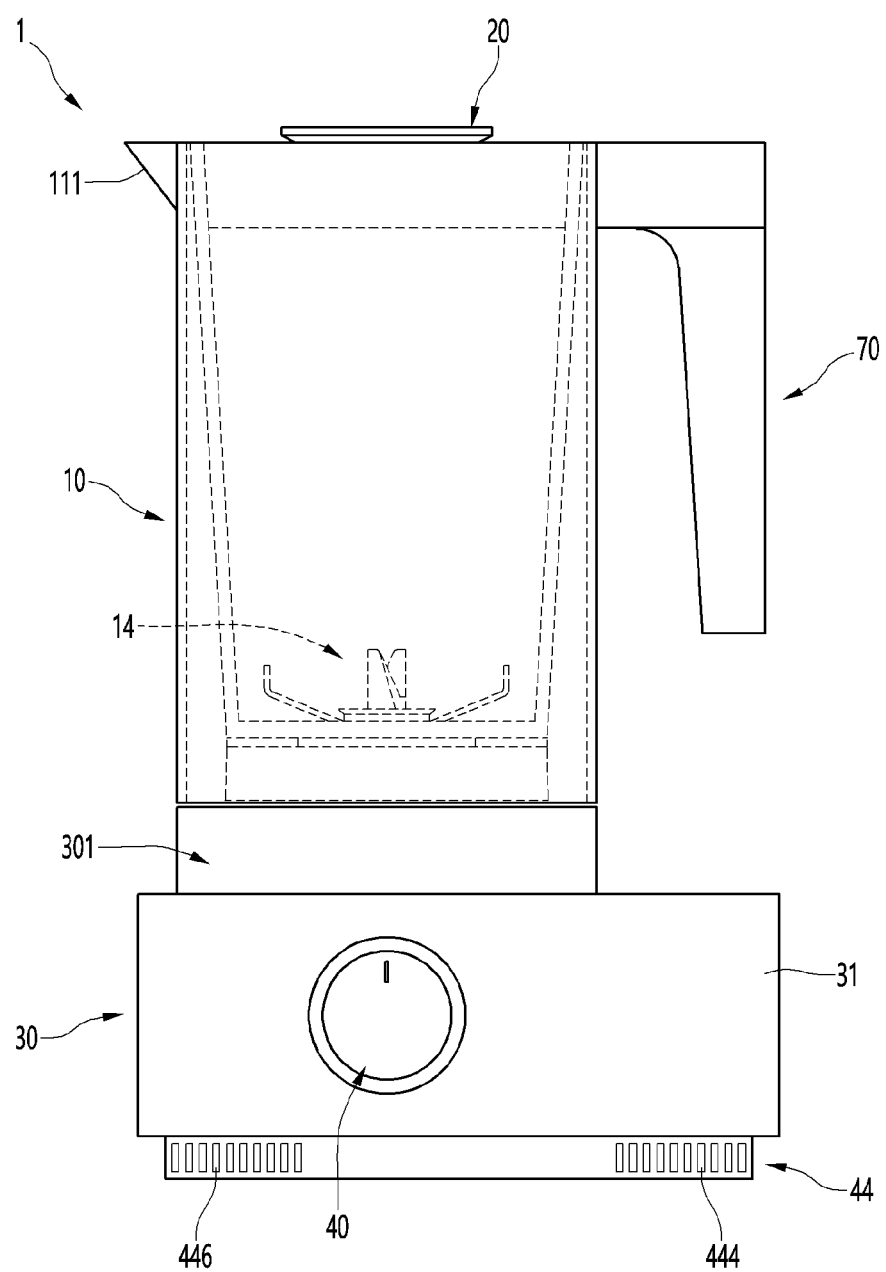
FIG. 1 is a front view illustrating a blender according to a first embodiment of the present disclosure.

For simplicity and clarity of illustration, elements in the figures are not necessarily drawn to scale. The same reference numbers in different figures may denote the same or similar elements, and as such may perform similar functionality. Also, descriptions and details of well-known steps and elements may be omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Examples of various embodiments are illustrated and described further below. It will be understood that the description herein is not intended to limit the claims to the specific embodiments described. On the contrary, it is intended to cover alternatives, modifications, and equivalents as may be included within the spirit and scope of the present disclosure as defined by the appended claims.

It will be understood that, although the terms "first", "second", "third", and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being "connected to", or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

Spatially relative terms, such as "beneath," "below," "lower," "under," "above," "upper," and the like, may be used herein for ease of explanation to describe one element or feature's relationship to another element or feature as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented for example, rotated 90 degrees or at other orientations, and the spatially relative descriptors used herein should be interpreted accordingly.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of the associated listed items. Expression such as "at least one of" when preceding a list of elements may modify the entire list of elements and may not modify the individual elements of the list.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In the following description, numerous specific details are set forth in order to provide a thorough understanding of the present disclosure. The present disclosure may be practiced without some or all of these specific details. In other instances, well-known process structures and/or processes have not been described in detail in order not to unnecessarily obscure the present disclosure.

Figure 2:
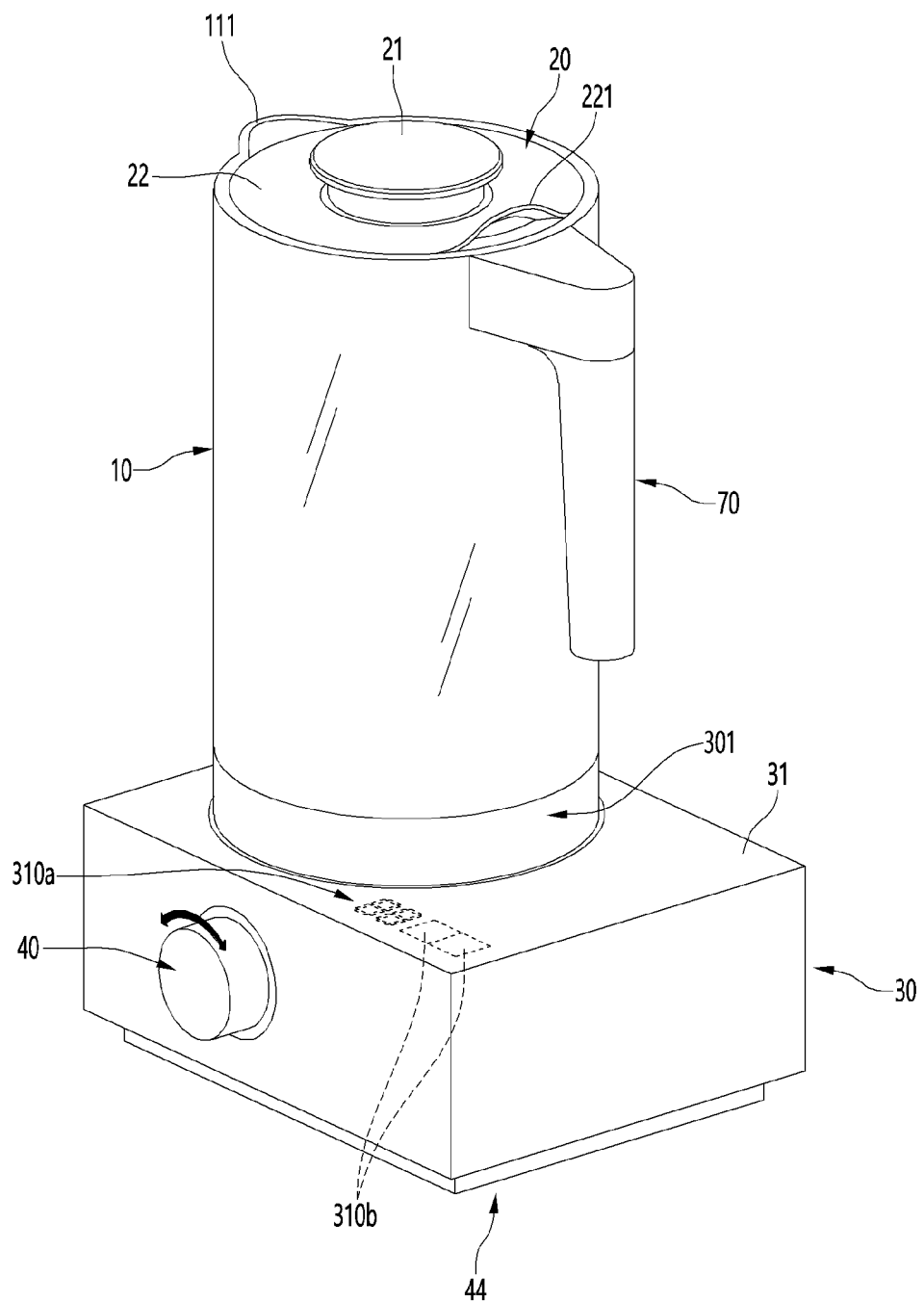
FIG. 2 is a perspective view illustrating the blender.
Figure 3:
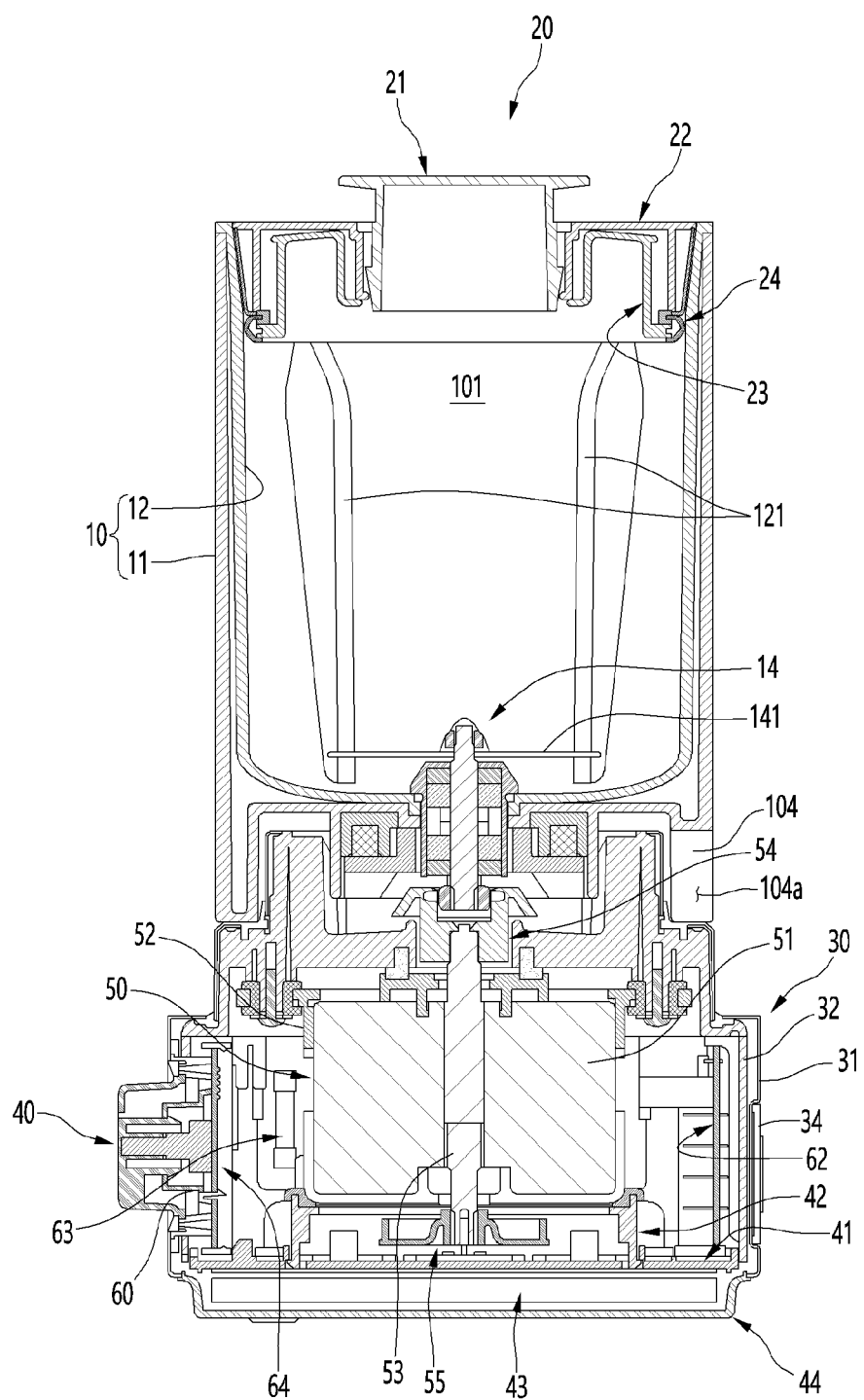
FIG. 3 is a longitudinal cross-sectional view illustrating the blender.
Figure 4:
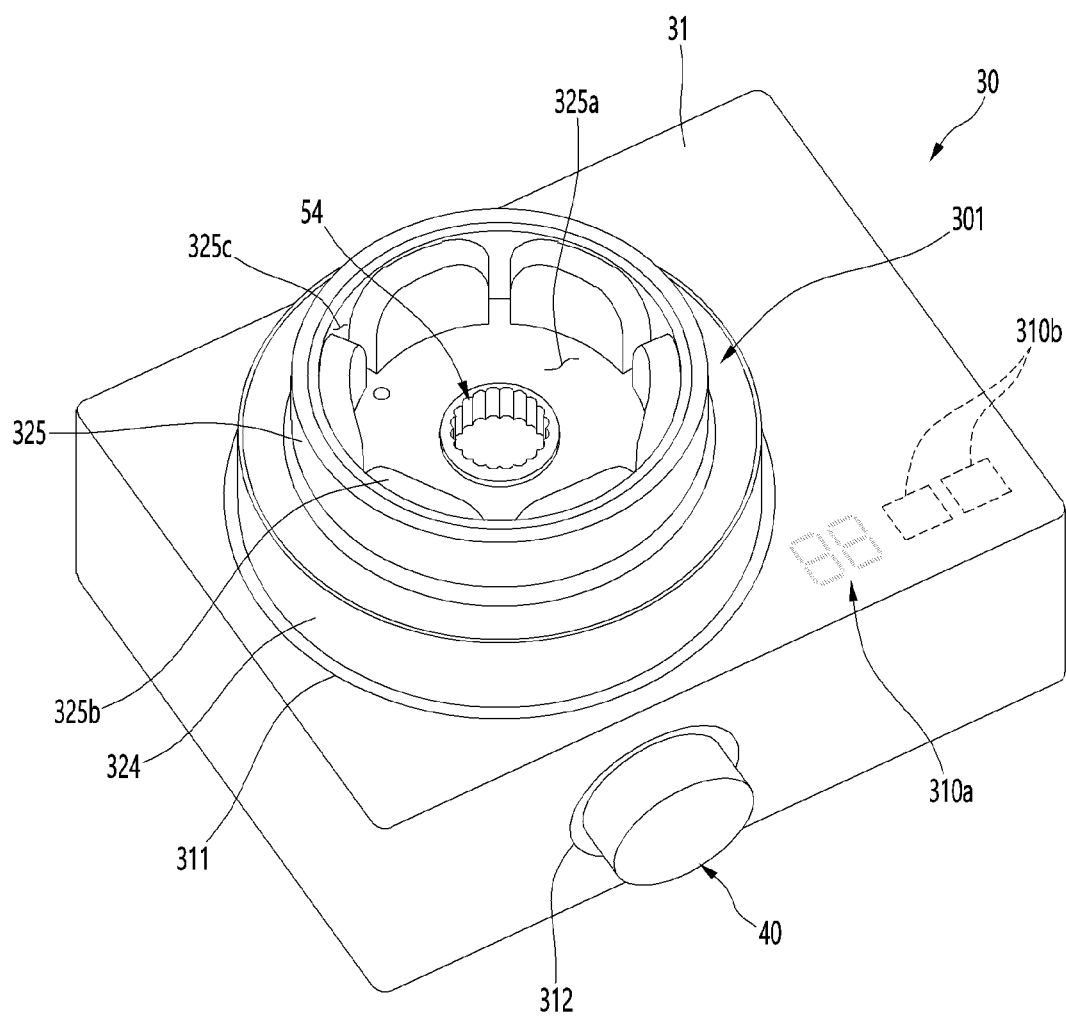
FIG. 4 is a perspective view illustrating a main body that is one component of the blender.

FIG. 1 is a front view illustrating a blender according to a first embodiment of the present disclosure, FIG. 2 is a perspective view illustrating the blender, FIG. 3 is a longitudinal cross-sectional view illustrating the blender, and FIG. 4 is a perspective view illustrating a main body that is one component of the blender.

For the convenience of explanation and understanding, the direction is first defined. The position at which a knob 40 is formed is defined as a front surface or a front side, and the portion to which a rear plate (34 in FIG. 3) is disposed is defined as a rear surface or a rear side. In addition, the position of the bottom of a main body 30 may be referred to as a lower surface or lower side, and the position of the upper end of the container 10 may be referred to as an upper surface or an upper side. In addition, the left side based on the knob 40 may be referred to as a left surface or a left side, and the right side based on the knob 40 may be defined as a right side or a right side.

As illustrated, the blender 1 according to an embodiment of the present disclosure may include the main body 30 disposed on the bottom surface, and a container 10 seated on the upper portion of the main body 30.

The main body 30 may be provided with electrical devices and components, including a motor assembly 50 and a printed circuit board (PCB) device 60 for the operation of the blender 1. In addition, manipulating portions 40 and 310b for manipulating the operation of the blender 1 and a display portion 310a for displaying operation thereof may be provided. The manipulating portions 40 and 310b may include at least one of the knob 40 and the touch manipulating portion 310b.

The main body 30 may be formed in a hexahedral shape as a whole, and a container seating portion 301 for seating the container 10 may be formed on an upper surface of the main body 30. The container seating portion 301 may be configured to detach the container 10 in the vertical direction.

The outer appearance of the main body 30 may be formed by an outer case 31, and the outer case 31 may be formed in a hexahedral shape with a bottom surface open. In addition, an inner case 32 may be formed inside the outer case 31, and space in which the motor assembly 50, the PCB device 60, and the like are mounted may be provided inside the inner case 32.

The internal and overall structure of the main body 30 is formed by the inner case 32, and the outer case 31 may be mounted on the outside of the inner case 32 to form the outer appearance of the main body 30. The inner case 32 may be injection molded with a plastic material to provide a structure in which internal and external configurations of the main body 30 can be mounted. In addition, the outer case 31 may be made of a plate-like metal material such as stainless steel, and the plate-like material may be bent and bonded to provide a very clean and robust outer appearance shape.

The knob 40 for the user to set the manipulation of the blender 1 may be provided on the front surface of the main body 30. The knob 40 protrudes from the front surface of the main body 30 and can be operated by rotational manipulation to set the operation of the blender.

A bottom cover 44 may be provided on the lower surface of the main body 30. The bottom cover 44 may be coupled to the outer case 31 and the inner case 32 and may be formed to be in contact with the bottom surface on which the blender 1 is installed. In addition, the bottom cover 44 allows the outer case 31 and the inner case 32 to be spaced apart from the bottom surface, and a cover suction port 444 and a cover discharge port 446 through which cooling air is suctioned and discharged into and out of the main body 30 can be formed.

The display portion 310a for visualizing an operation state of the blender 1 may be provided on the upper surface of the main body 30. For example, the display portion 310a may have a shape such as at least one seven-segment display. In addition, The touch manipulating portion 310b capable of manipulating the start or stop of the blender 1 operation may be provided on the upper surface of the main body 30.

In addition, the container seating portion 301 may be formed on the upper surface of the main body 30. In detail, an upper surface opening 311 may be formed on the upper surface of the outer case 31. The upper surface opening 311 may be formed to have a diameter equal to or slightly larger than the outer diameter of the container seating portion 301. Accordingly, when the inner case 32 and the outer case 31 are coupled, an upper portion of the inner case 32 forming the container seating portion 301 may penetrate the upper surface opening 311 and is exposed to the outside of the outer case 31.

The container seating portion 301 may protrude from the upper surface of the main body 30, and a portion of the container seating portion 301 may be inserted into the lower surface of the container 10 to stably support the container 10. If the container 10 is seated on the container seating portion 301, the motor assembly 50 and a blade device 14 inside the container 10 are coupled to each other to transmit the rotational force to the blade device 14.

The container seating portion 301 may be located on one side slightly biased from the center of the main body 30. The entire horizontal length including a handle 70 of the container 10 and the horizontal length of the main body 30 are formed to correspond to each other. Accordingly, the center of the food receiving space of the container 10 may be positioned to be eccentric, that is offset from the center of the main body 30, and the center of the container seating portion 301 may be also located on the same extension line as the center of the container 10. In addition, the knob 40 may be located at a position corresponding to the center line of the container seating portion 301 and the container 10 may be located on a side eccentric when viewed from the front of the main body 30. In addition, the side end of the handle 70 may be located on the same extension line as one side end of the main body 30. Therefore, the blender 1 can give a more stable feeling when viewed from the front and can provide a balanced structure.

The outer appearance of the container seating portion 301 may also be made of the same material as the outer case 31. The container seating portion 301 may be made of a metal material or a material having a metal texture to have a sense of unity with the outer appearance of the main body.

The container seating portion 301 may be formed with a first seating portion 324 and a second seating portion 325 formed stepwise in the vertical direction. The second seating portion 325 may be formed to have a smaller outer diameter than the first seating portion 324.

The second seating portion 325 may extend upward from the upper surface of the first seating portion 324, and an insertion space 325a in which a container coupling portion 103 may be received may be formed therein. A coupling support portion 325b and a container coupling groove 325c may be formed on the inner circumferential surface of the insertion space 325a.

The coupling support portion 325b may form at least a portion of the inner circumferential surface of the second seating portion 325. In addition, when the container 10 is mounted, the coupling support portion 325b may be protruded to support the outer surface of the container coupling portion 103. A plurality of the coupling support portions 325b may be spaced apart, and a guide coupling groove 325c may be formed between neighboring coupling support portions 325b.

Therefore, if the container 10 is mounted on the container seating portion 301, the container coupling portion 103 may be mounted in an aligned state by the guide coupling grooves 325c. In addition, the coupling support portions 325b may support the outer surface of the container coupling portion 103 so that the container 10 is maintained in a securely mounting state while being mounted on the container seating portion 301. Therefore, the container 10 does not topple in the mounted state and stable operation thereof may be ensured.

The motor assembly 50 may be mounted inside the main body 30 under the container seating portion 301. The motor assembly 50 is for rotation of the blade device 14 inside the container 10 and the blade device can be rotated at a high speed. In addition, the motor assembly 50 may adjust the rotational speed according to the manipulation of the knob 40.

The upper end of the motor assembly 50 may be connected to the blade device 14 inside the container 10. In addition, a cooling fan 55 may be provided at a lower end of the motor assembly 50, and when the motor assembly 50 is driven, the cooling fan 55 can rotate simultaneously with the blade device 14 to force the flow of cooling air inside the main body 30.

Meanwhile, a plurality of PCB devices 60 may be disposed on the inner wall surface of the inner case 32 forming the inner surface of the main body 30. The plurality of PCB devices 60 may be provided and may be disposed on the circumference of the inner surface of the main body 30, that is, on the front surface and the rear surface, and both left and right surfaces thereof, respectively.

In addition, the opened lower surface of the inner case 32 may be shielded by a base plate 41. In addition, an air guide 42 for guiding the discharge of cooling air suctioned by the cooling fan 55 may be provided on the base plate 41.

A predetermined space may be formed between the base plate 41 and the bottom cover 44, and an optional wireless power device 43 may be provided between the base plate 41 and the bottom cover 44. The wireless power device 43 is capable of supplying power to the motor assembly 50 in a wireless manner using induced electromotive force.

Meanwhile, the container 10 may be formed in a cylindrical shape corresponding to the outer diameter of the container seating portion 301, and the upper surface of the container 10 is open to form a food receiving space therein. The container 10 may be made of glass or a material that can be seen through the inside, such as glass. For example, the container 10 may be made of a tritan material that is transparent yet resistant to impact and generates very little scratches.

The container 10 may be provided with the blade device 14 at the center of the inner lower surface. The blade device 14 includes a plurality of blades 141 and may be connected to the motor assembly 50. Therefore, when the motor assembly 50 is driven in a state where the container 10 is seated on the main body 30, the blades 141 may be rotated to crush or cut food inside the container 10.

In addition, a plurality of inner guides 121 for guiding food to be rotated may be formed inside the container 10. The inner guides 121 may extend upward from a lower end of the inner surface of the container 10 to a predetermined length and may extend to a lower surface of the lid 20 when the lid 20 is mounted.

Meanwhile, a spout 111 that can pour the crushed food may protrude from the upper end of the container 10, and the handle 70 may protrude from one side facing the spout 111. The handle 70 protrudes outward from the upper end of the container 10 and then extends downward to allow the user to lift or move the container 10. The protruding end portion of the handle 70 may be located on the same extension line as the side end of the main body 30.

In addition, the lid 20 may be mounted on the opened upper surface of the container 10. The lid 20 may close the opened upper surface of the container 10, and the user may hold the lid handle 70 and separate the lid 20 from the container 10 so that the closed opened upper surface of the container 10 can be opened. The lid 20 may include a lid upper portion 22, a lid lower portion 23, and a lid handle 21, and a lid gasket 24 may be provided along the circumference of the lid 20.

Hereinafter, a structure of the container 10 will be described in more detail, with reference to the drawings.

Figure 5:
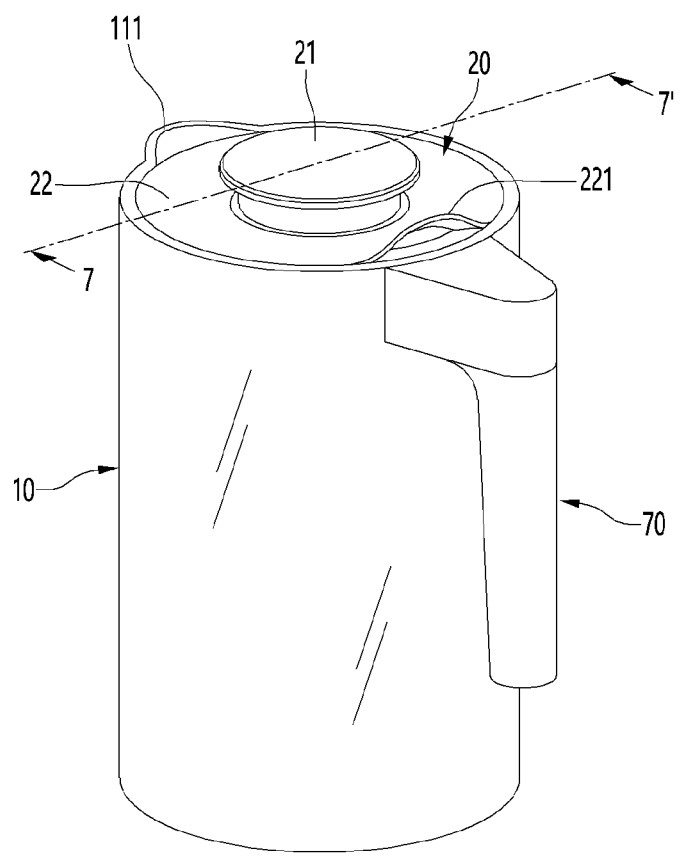
FIG. 5 is a perspective view illustrating a container that is one configuration of the blender.
Figure 6:
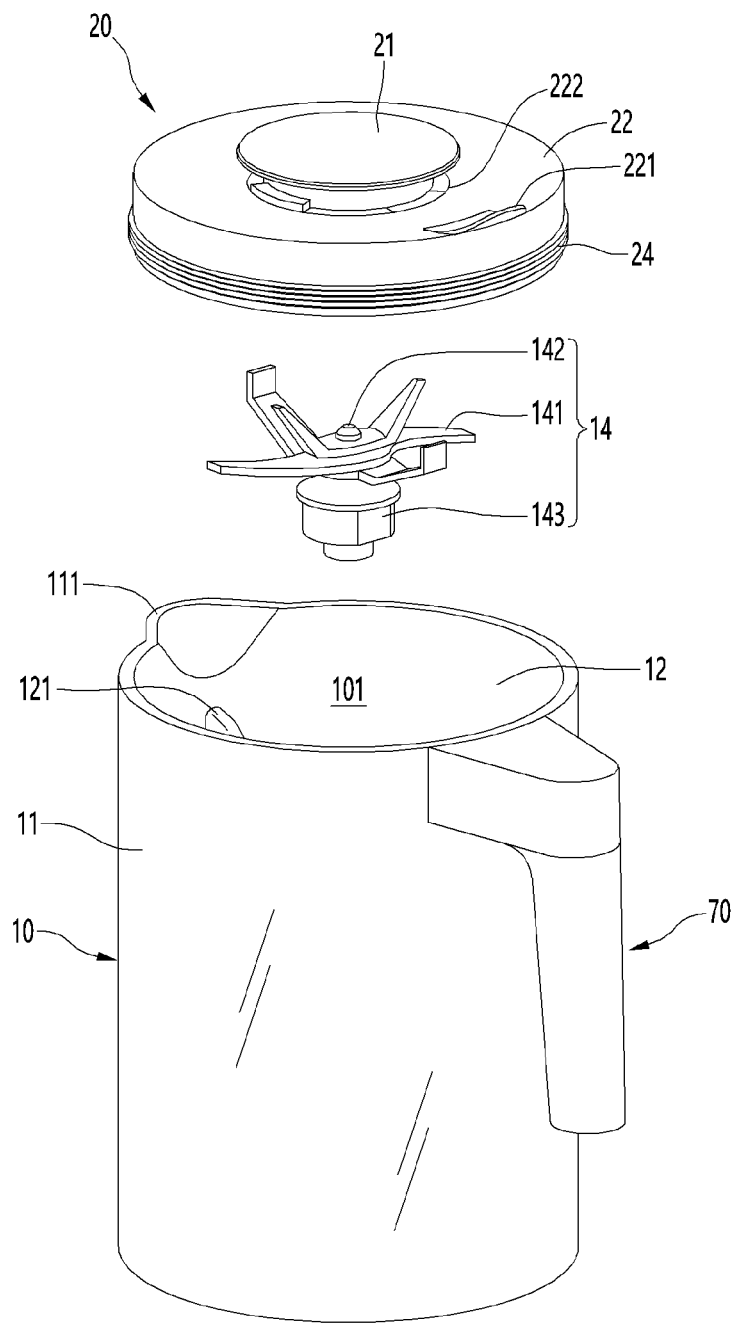
FIG. 6 is an exploded perspective view illustrating the container.
Figure 7:
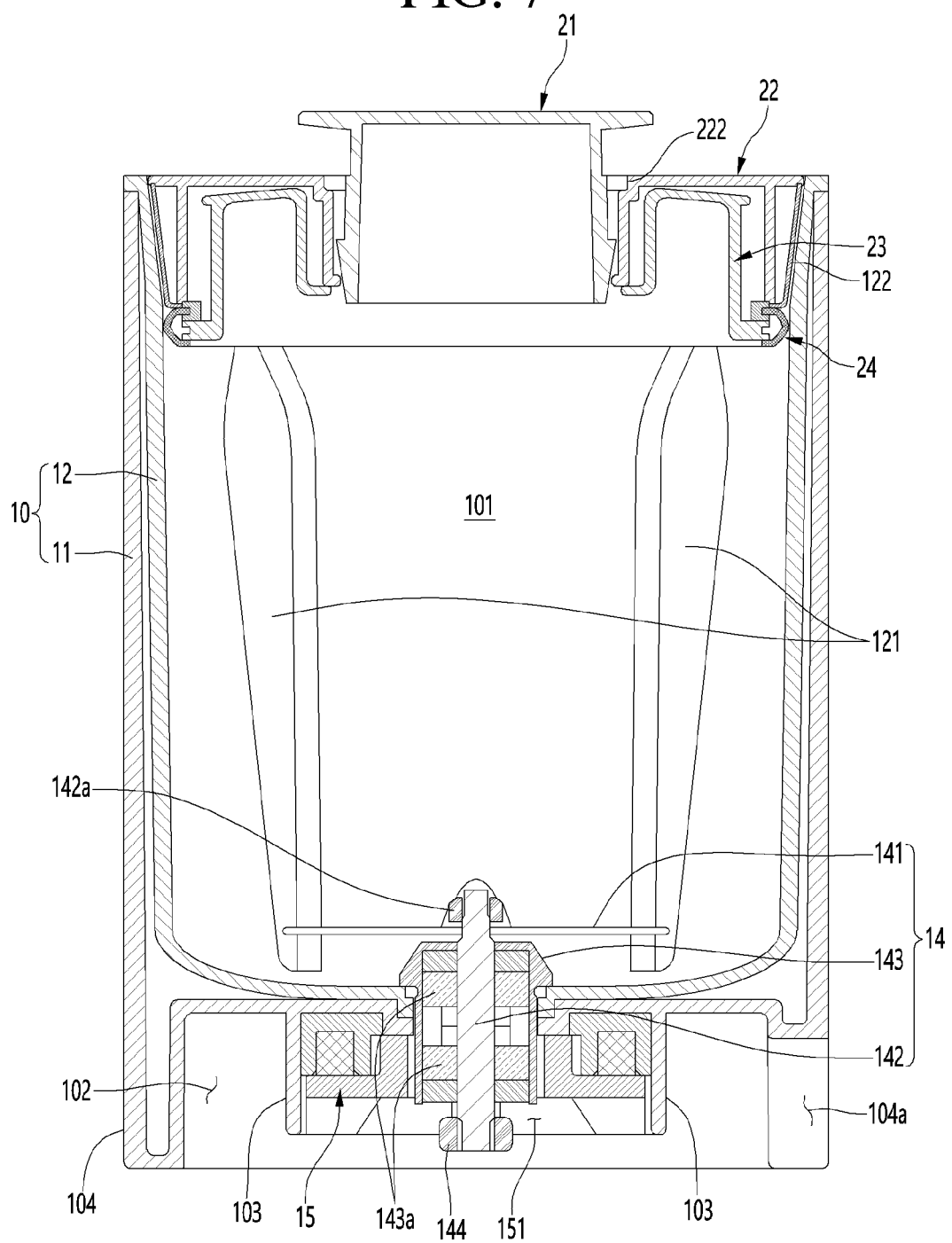
FIG. 7 is a cross-sectional view taken along line 7-7' of FIG. 5.
Figure 8:
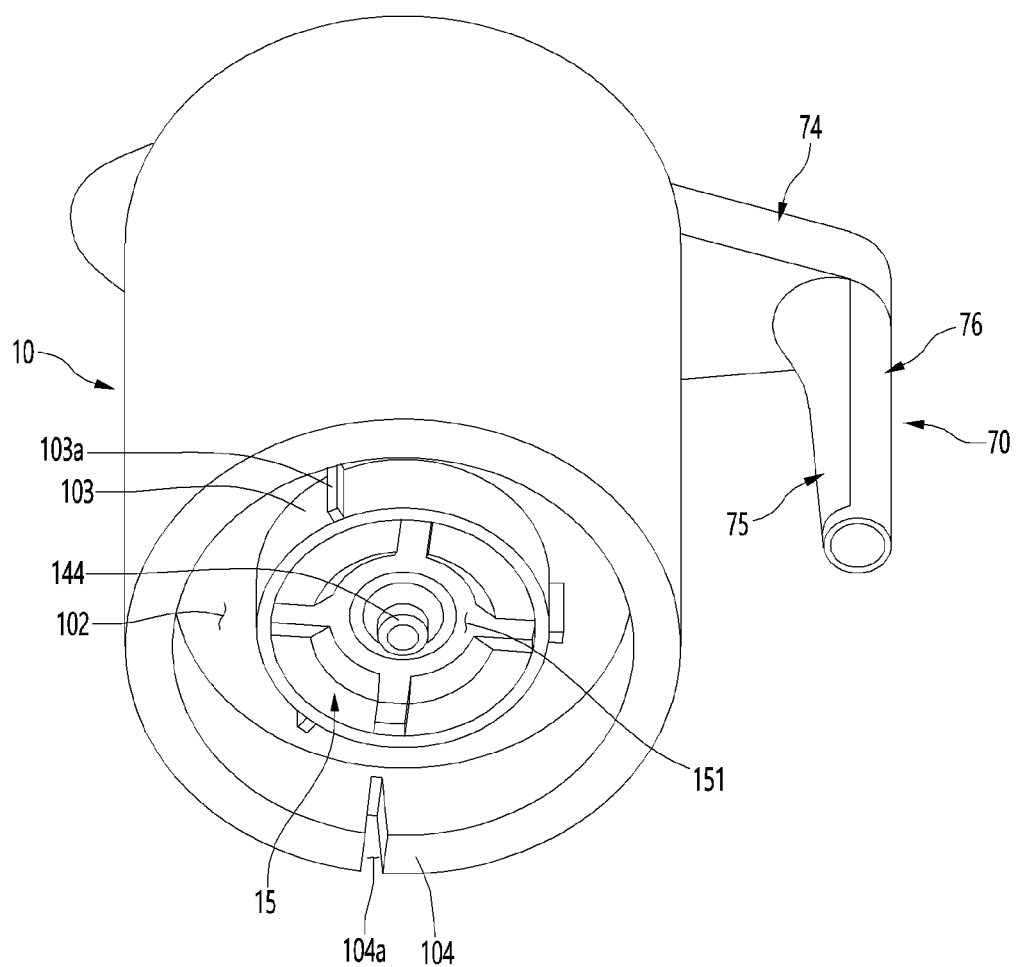
FIG. 8 is a perspective view illustrating the container as viewed from below.

FIG. 5 is a perspective view illustrating a container that is one configuration of the blender, FIG. 6 is an exploded perspective view illustrating the container, FIG. 7 is a cross-sectional view taken along line 7-7' of FIG. 5, and FIG. 8 is a perspective view illustrating the container as viewed from below.

As illustrated in the drawing, the container 10 is formed in a cylindrical shape with an opened upper surface. In addition, the blade device 14 is mounted on the lower surface of the container 10, and the lid 20 may be detachably mounted on the opened upper surface of the container 10.

The lid 20 may include the lid upper portion 22 forming an upper surface and the lid lower portion 23 coupled to the lid upper portion 22 and forming a lower surface of the lid 20. The lid handle 21 may be inserted into and mounted on an opened center of the lid upper portion 22 and the lid lower portion 23, and may be provided detachably. Therefore, the food can be added or access to the inner space 101 of the container 10 is possible in a state where the lid handle 21 is separated.

In addition, the lid gasket 24 which is in contact with the inner surface of the container 10 to seal the inside of the container 10 may be provided on the circumference of the lid 20. Therefore, the lid 20 can be inserted through the opened upper surface of the container 10, and the lid gasket 24 may maintain a seal while being in contact with the inclined surface of the container 10 in a state where the lid 20 is mounted. In addition, the lid gasket 24 may be pressed against and be in close contact with the inner surface of the container 10 to prevent the lid 20 from being unintentionally separated from the container 10.

A handle portion 221 may be further formed at an outer end portion of the lid upper portion 22. The handle portion 221 has a shape in which a portion of the lid upper portion 22 protrudes upward so that a user can hold the handle portion 221 by hand, through space which is spaced apart from the lid lower portion 23 and into which the user's fingers can be inserted. Therefore, in a state where the lid handle 21 is not used or the lid handle 21 is separated, the user can easily separate the lid 20 while holding the handle portion 221.

The container 10 may be made of a material such as glass, tritan, and transparent plastic to check a state of the food inside the container during the operation of the blender 1. In addition, the container 10 may include an outer container 11 forming an outer shape and an inner container 12 forming an inner space in which food is received.

The inner container 12 and the outer container 11 are coupled with each other to form the overall shape of the container 10, and the container 10 may have a double-wall structure.

In detail, the inner container 12 may be spaced apart from the outer container 11 to form a space between the outer container 11 and the inner container 12. The inner container 12 may have a smaller diameter as it goes downward. The lower portion of the inner container 12 is formed to be inclined or rounded towards the blade device 14 so that the food in the container 10 is directed to the blade device 14.

Meanwhile, the upper end of the inner container 12 may be formed to have an inclined surface whose inner diameter becomes narrower as it goes downward. Therefore, in the process of inserting the lid 20 into the opened upper surface of the container 10, a seal may be formed while the inclined surface of the inner container 12 and the lid 20 come in close contact with each other. The inclined surface of the upper end of the inner container 12 may be formed from the upper end of the container 10 to the upper end of the inner guide 121 and may be formed along the inner surface circumference of the container 10. In addition, the inner guide 121 may be formed on the inner surface of the inner container 12. The inner guide 121 may extend from the inclined surface 122 to the bottom surface of the inner container 12.

In addition, the outer container 11 may be formed so that outer diameters of the upper end and the lower end thereof have the same cylindrical shape, and thus the outer appearance of the container 10 can be seen to be neat. In addition, the outer diameter of the outer container 11 may be formed to be the same as the outer diameter of the container seating portion 301, so that the main body 30 and the container 10 may have a sense of unity in a state where the container 10 is mounted.

In addition, the lower surface of the outer container 11 may be formed with a main body receiving portion 102. The main body receiving portion 102 forms a space recessed upward from the lower surface of the outer container 11 and forms space into which the second seating portion 325 described above may be inserted. By the coupling of the main body receiving portion 102 and the second seating portion 325, the container 10 may maintain a state of being mounted on the container seating portion 301.

A container coupling portion 103 on which the blade device 14 is mounted may be formed at the center of the lower surface of the outer container 11. The container coupling portion 103 may be located on the inner surface of the outer container 11 and the inner center of the body receiving portion 102. The container coupling portion 103 may be formed to protrude downward in a rib shape extending downward about the center of the bottom surface of the container 10. In addition, the container coupling portion 103 does not extend further downward than the lower end of the outer container 11 and provides a space in which the blade device 14 is disposed in the center of the container 10. In addition, the inside of the container coupling portion 103 may have a structure that is fitted to the inside of the container seating portion 301 when the container is seated on the container seating portion 301.

In addition, a lower end support portion 104 may be formed around the lower surface of the container 10. The lower end support portion 104 may be spaced apart from the circumference of the container coupling portion 103, and the main body receiving portion 102 may be formed between the lower end support portion 104 and the container coupling portion 103. The main body receiving portion 102 forms a space into which an upper end of the container seating portion 301 may be inserted.

The lower end support portion 104 may be formed by extending the outer container 11 downward and forms a circumference of the lower end of the container 10. In addition, the lower end support portion 104 may be formed by a shape in which a lower end of the outer container 11 is bent.

The lower end of the lower end support portion 104 may be formed to have a predetermined thickness and may be supported by the stepped container seating portion 301. In addition, the outer surface of the lower end support portion 104 may be located on the same circumferential surface as the outer surface of the container seating portion 301, and in a state where the container 10 is mounted on the container seating portion 301, the container 10 and the main body 30 may have a sense of unity.

The lower end support portion 104 may extend further downward than the lower end of the container coupling portion 103. Therefore, it is possible to prevent the container coupling portion 103 from interfering with the container seating portion 301 before the container 10 is completely mounted on the main body 30. In addition, when the container 10 is placed on a surface in a separated state, the container coupling portion 103 may be spaced apart from the surface, and the lower end support portion 104 is in contact with the surface, so that the container 10 may maintain a state of being stably supported.

Meanwhile, an air vent 104a may be formed on the lower end support portion 104. The air vent 104a forms a passage through which air enters and exits between the lower surface of the container 10 and the upper surface of the container seating part 301 when the container 10 and the seating portion 301 are coupled to each other or separated from each other so that the container 10 can be easily mounted on and separated from the container seating portion 301.

Meanwhile, the lower surface of the container 10 may be provided with the blade device 14 in the center thereof. The blade device 14 is for crushing the food received in the inner space 101 of the container 10 and may include the plurality of blades 141, a blade shaft 142, and a shaft mounting member 143.

The plurality of blades 141 may be extended in different directions from each other, the plurality of blades may be configured in combination, and the plurality of blades 141 may be radially disposed about the blade shaft 142. The blades 141 may be formed to be symmetrical about the blade shaft 142, and extension directions, bending angles, and shapes of the plurality of blades 141 may be formed differently, respectively. In other words, blades 141 of various shapes may be combined to be suitable for both grinding and cutting various foods and making foods into a powder or a liquid.

The blade shaft 142 is mounted to penetrate the shaft mounting member 143 and may be supported by a bearing 143a constituting the shaft mounting member 143. A plurality of bearings 143a may be disposed in the vertical direction and may support the blade shaft 142 so that the blade shaft 142 can be stably rotated. In addition, the shaft mounting member 143 may be securely fixed through the bottom surface of the container 10.

A blade constraining member 142a for preventing the separation of the blade 141 and maintaining a state where the blade 141 is fixed to the blade shaft 142 may be fastened to the upper end of the blade shaft 142.

In addition, a blade-side connecting portion 144 may be formed on the lower end of the blade shaft 142. The blade-side connecting portion 144 may be exposed at the center of the bottom surface of the container 10 and may protrude downward. Therefore, when the container 10 is mounted on the container seating portion 301, the container is connected to a motor-side connecting portion 54 (see FIG. 3) so that the power of the motor assembly 50 may be transmitted to the blade shaft 142.

Meanwhile, the container coupling portion 103 may be formed on the bottom surface of the container 10, and a mounting cover 15 may be provided inside the container coupling portion 103. The mounting cover 15 forms a receiving space 151 in which the motor-side connecting portion 54 may be received when the container 10 is mounted on the container seating portion 301.

In other words, the center of the mounting cover 15 may be opened to be penetrated by the shaft mounting member 143, and the blade-side connecting portion 144 may be exposed through the center of the lower surface of the mounting cover 15. In addition, the central portion of the mounting cover 15 corresponding to the circumference of the blade-side connecting portion 144 is recessed, and thus is formed so that the motor-side connecting portion 54 is received.

Therefore, in the process in which the container 10 is seated on the container seating portion 301, the motor-side connecting portion 54 and the blade-side connecting portion 144 do not interfere with each other and have a structure that can be naturally coupled to each other.

Meanwhile, the handle 70 that can be held by a user to detach and attach the container 10 from and to the container seating portion 301 or to move the container 10 may be formed on one side of the container 10. The handle 70 protrudes from one side of the upper end of the container 10 and may be bent downward from the protruding end portion. The handle 70 is in a state where the upper end thereof is fixed to the outer surface of the container 10, and a portion which is held by a user's hand may be spaced apart from the container 10. Therefore, the user can easily hold the handle 70 in various directions.

The protruding position of the handle 70 may be formed at a position facing the spout 111. Therefore, it is possible to easily pour the food inside the container 10 by tilting the container 10, and in this case, the container 10 can be tilted while holding the handle 70.

The handle 70 extends from the outer container 11 and extends downwardly from the extended end in a state of being spaced apart from the outer container 11 so that the user can wrap the handle with their hand. In addition, the outer appearance of the handle 70 may be formed by a grip member 75 and a deco member 77.

Hereinafter, the structure of the handle 70 will be described in more detail with reference to the drawings.

Figure 9:
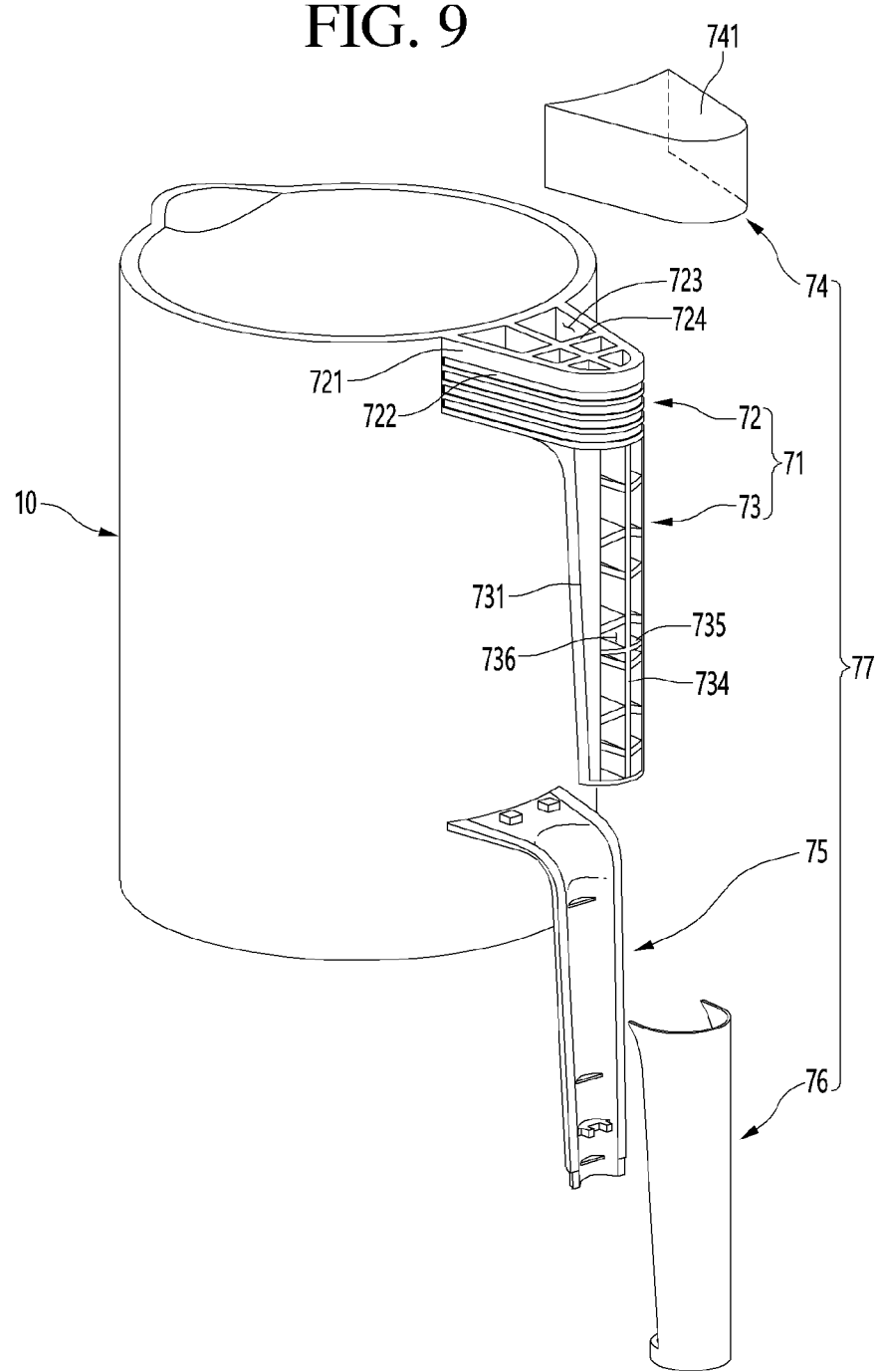
FIG. 9 is an exploded perspective view illustrating a coupling structure of the handle of the container as viewed from above.
Figure 10:
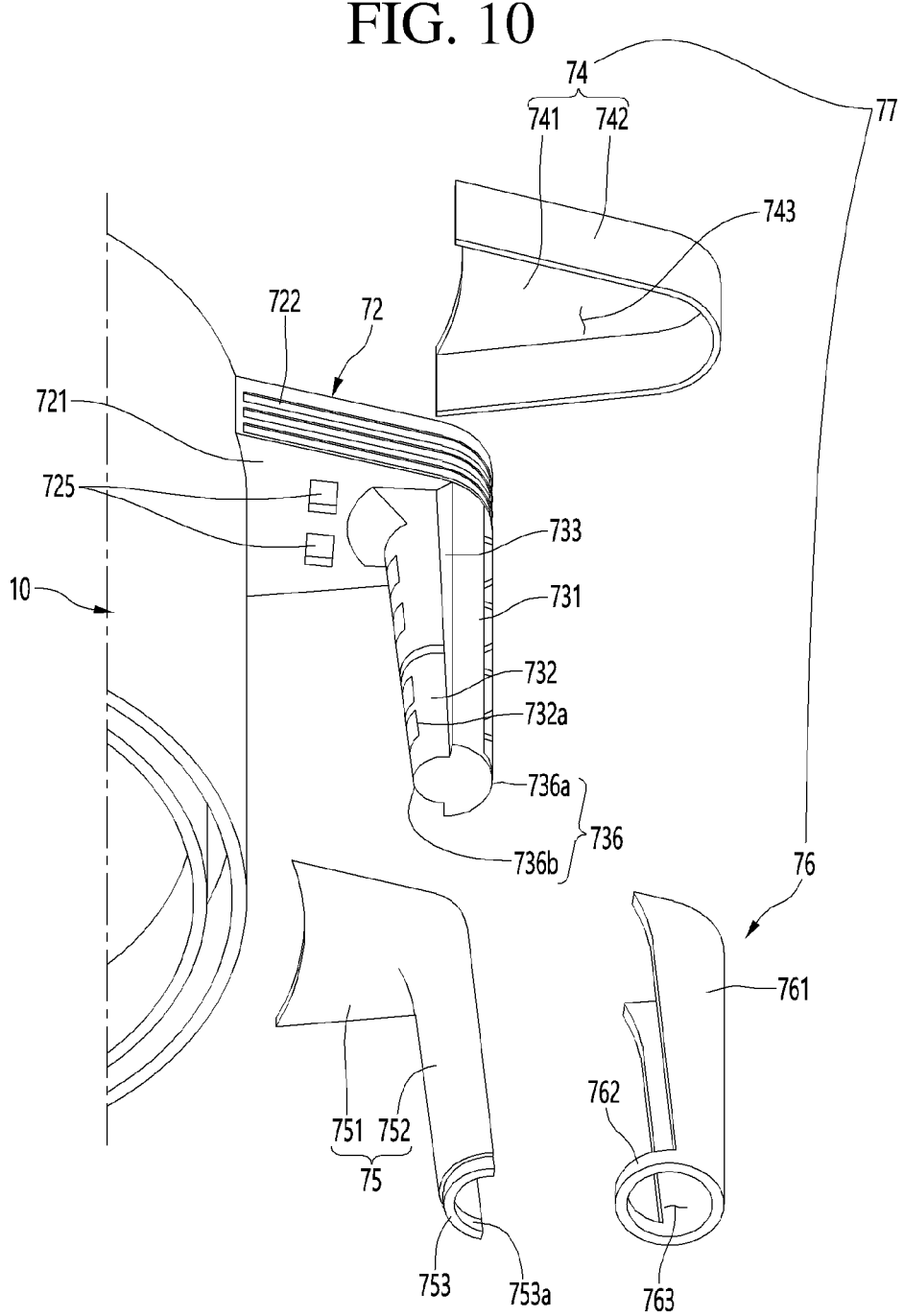
FIG. 10 is an exploded perspective view illustrating the coupling structure of the handle viewed from below.
Figure 11:
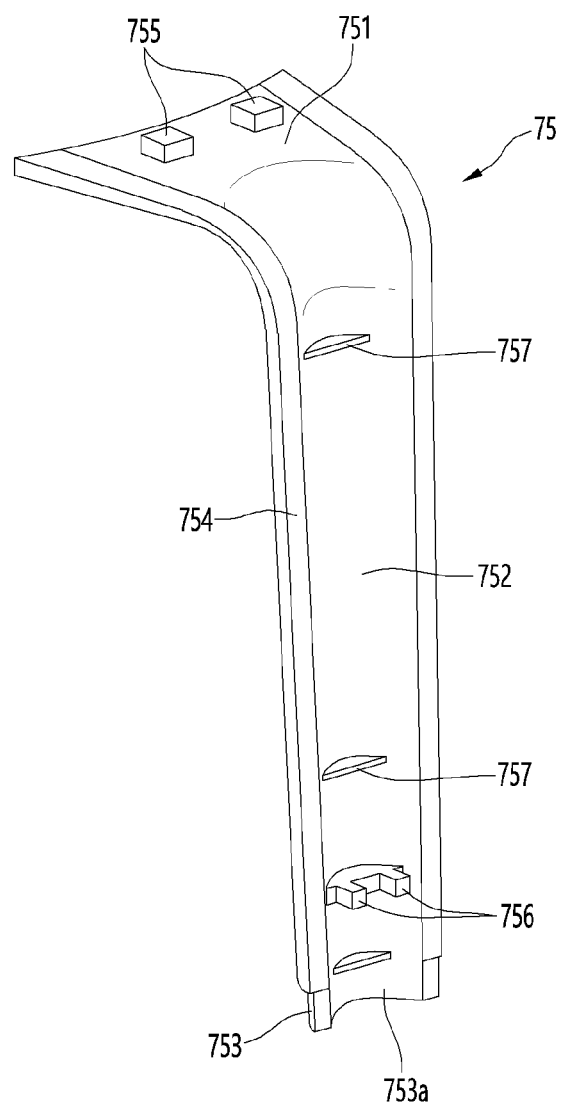
FIG. 11 is a perspective view illustrating a grip member which is one component of the handle.

FIG. 9 is an exploded perspective view illustrating a coupling structure of the handle of the container as viewed from above, FIG. 10 is an exploded perspective view illustrating the coupling structure of the handle viewed from below, and FIG. 11 is a perspective view illustrating a grip member which is one component of the handle.

As illustrated in the drawings, the handle 70 may include a handle body 71 extending from the outer container 11, the grip member 75 which shields a portion of the handle body 71 and is held when the user holds by hand, and the deco member 77 that shields a portion of the handle body 71 to form an outer appearance.

In detail, the handle body 71 protrudes from the outer container 11 and may be integrally formed of the same material as the outer container 11. For example, the handle body 71 may be formed together during molding of the outer container 11. The handle body 71 is integrally molded with the outer container 11 so that the load concentrated on the handle 70 can be partially transferred to the outer container 11.

Meanwhile, the handle body 71 may include an extension 72 extending outward from the outer container 11 and a grip portion 73 extending downwardly from an end portion of the extension 72.

The extension 72 may extend vertically from the upper end of the outer surface of the outer container 11 in the outer direction. In addition, the extension 72 may be formed to have a narrower width towards the extension direction. In addition, the extended end portion of the extension 72 may be formed to be rounded.

In addition, the extension 72 has an overall shape formed by an extension body 721 with an opened upper surface, and an extension space 723 may be formed inside the extension body 721. The extension space 723 may be partitioned into a plurality of spaces by an extension reinforcement rib 724 provided inside the extension body 721.

The extension reinforcement rib 724 extends from the bottom of the extension 72 to the opened upper surface of the extension 72 and may be formed so that a plurality of extension reinforcement ribs intersects in a lattice shape. In addition, when an extension deco 74 to be described below is mounted, an upper surface portion 741 of the extension deco 74 may be supported.

The extension 72 may prevent deformation in a process of being injected together with the outer container 11 by the extension space 723 and the extension reinforcement rib 724 formed on the extension 72 and the strength of the extension 72 may be ensured by the extension reinforcement rib 724.

Meanwhile, a plurality of extension grooves 722 may be formed on the outer surface of the extension 72, that is, the circumferential surface of the extension body 721. The extension groove 722 may be formed from one end to the other end of the extension 72 which is in contact with the outer container 11 and may be recessed along the circumference of the extension body 721. A plurality of the extension grooves 722 may be disposed at regular intervals in the vertical direction.

The extension groove 722 may further improve the strength of the extension 72. In addition, the extension groove 722 may allow the extension 72 to be more easily inserted into the extension deco 74. In addition, an adhesive is received in the extension groove 722 when the extension deco 74 is mounted, so that the extension deco 74 and the outer surface of the extension body 721 can be more securely coupled.

In addition, a body coupling portion 725 may be opened on the lower surface of the extension 72. The body coupling portion 725 may be formed at a position corresponding to an upper coupling protrusion 755, which will be described below, and may be coupled with the upper coupling protrusion 755. For example, the upper coupling protrusion 755 may be inserted inside the body coupling portion 725. In addition, a screw penetrating the upper coupling protrusion 755 may be fastened and further fixed.

The grip portion 73 may extend downward from an extended end of the extension body 721. At this time, the front surface (right side in FIG. 9) of the outer surface of the grip portion 73 may be formed to be round and may be formed to correspond to the curvature of the extended end portion of the grip portion 73. The grip portion 73 is a component of the handle 70 and may also be injected and molded together when the outer container 11 is molded. In addition, the grip portion 73 may be formed to have a narrower cross-sectional area towards the lower side, and the circumferential surface thereof may be rounded for easily holding by the user.

A grip stepped portion 733 may be formed on both left and right side surfaces of the grip portion 73. The grip stepped portion 733 may extend from the upper end to the lower end of the grip portion 73 and may be formed in a stepped shape. For example, the grip stepped portion 733 may extend along the centers of both side surfaces of the grip portion 73 in the vertical direction, and thus guide the mounting positions of the grip member 75 and the deco member 77.

The grip portion 73 may be partitioned into a grip member mounting portion 732 on which the grip member 75 is mounted and a deco member mounting portion 731 on which the deco member 77 is mounted based on the grip stepped portion 733. The grip member mounting portion 732 is formed at a position facing the outer container 11, and the grip member 75 may be mounted. To this end, a grip coupling portion 732a may be formed on the grip member mounting portion 732. A lower coupling projection 756 of the grip member 75 may be inserted into the grip coupling portion 732a. The lower coupling projection 756 may be formed in a hook-like shape and may be press-fitted into the grip coupling portion 732a.

The thickness of the grip member 75 may be thicker than the thickness of a grip portion deco 76. Therefore, in order to prevent the outer appearance of the handle 70 from being stepped, the grip member mounting portion 732 may be formed to have a relatively smaller cross-sectional size than the deco member mounting portion 731.

Meanwhile, the deco member mounting portion 731 may be formed at a position distant from the outer container 11 relative to the grip stepped portion 733, that is, a position opposite to the grip member mounting portion 732. The grip portion deco 76 may be mounted on the deco member mounting portion 731.

The deco member mounting portion 731 is opened to the outside, and a grip portion space 736 may be formed therein. In addition, the grip portion space 736 may be partitioned into a plurality of spaces by a center rib 734 and side ribs 735.

Both center rib 734 and side ribs 735 may extend to the outer surface of the grip portion 73 and may be formed to correspond to the curvature of the grip portion 73. Therefore, the grip portion deco 76 may be supported by the deco member mounting portion 731 including the center rib 734 and the side ribs 735, so that the grip portion deco 76 can be mounted to be in close contact with the grip portion 73.

The center rib 734 may be formed along the center of the grip portion space 736. Accordingly, the center rib 734 divides the grip portion space 736 into the left and right sides. In addition, side ribs 735 may be formed on both sides of the left and right sides based on the center of the partitioned grip portion space 736, respectively. The plurality of side ribs 735 connect between the center rib 734 and side surfaces of the grip portion 73 and partition the grip portion space 736 into a plurality of upper and lower spaces. In this embodiment, a plurality of the side ribs 735 are disposed in a zigzag manner, so that the inside of the grip portion space 736 has a truss-like structure, and thus strength thereof may be enhanced.

The grip portion 73 may also be prevented from being deformed by the grip portion space 736 when being injection-molded to extend downward, and even if a load is applied to the grip portion 73, the center rib 734 and side ribs 735 may prevent the grip portion from being deformed or damaged.

Meanwhile, the lower surface of the grip portion space 736 of the grip portion 73 may be composed of a first lower end portion 736a at the lower end of the grip member mounting portion 732 and a second lower end portion 736b at the lower end of the deco member mounting portion 731. The lower surface of the grip portion space 736 of the grip portion 73 may be exposed through a deco hole 763 of the grip portion deco 76. In particular, when the grip member 75 is mounted on the grip member mounting portion 732, a grip member stepped portion 753 at the lower end of the grip member 75 and the second lower end portion 736b may engage with each other and be coupled, and the grip member 75 may be inserted into the deco hole 763 together to be in a state of being mounted on the grip member mounting portion 732.

The grip member 75 may form a position that the user holds by hand, that is, the outer appearance of the inside of the grip member facing the outer container 11. In addition, the grip member 75 may be formed of different materials from that of the handle body 71 and the deco member 77 to prevent slipping when the user holds the grip member 75 by hand. The surfaces of the handle body 71 and the deco member 77 may have smooth and slippery properties, but the grip member 75 may be configured to have surface properties capable of increasing a frictional force. For example, the grip member 75 may be made of a material such as synthetic resin, rubber, or silicone.

Of course, the surface of the grip member 75 may be coated or a film attached for preventing slip, and/or a pattern may be formed on the surface of the grip member 75 to prevent slip.

The grip member 75 is mounted on the grip member mounting portion 732 and may be configured to cover the rest of the outer surface of the handle 70 which is not covered by the deco member 77. In particular, the grip member 75 may be located on a portion of the entire outer surface of the handle 70 facing the outer container 11. Accordingly, the grip member 75 may be disposed on a portion where the finger is positioned when the user holds the handle and minimize the portion of the grip portion 73 exposed to the outside so as not to impair the overall outer appearance design.

The grip member 75 may include an upper part 751 coupled to the extension 72 and a lower part 752 coupled to the grip member mounting portion 732. In addition, the upper part 751 and the lower part 752 may be integrally formed.

The upper part 751 is formed in a shape corresponding to the lower surface of the extension 72 and is in close contact with the lower surface of the extension 72 to shield the lower surface of the extension 72.

The upper coupling protrusion 755 protrudes upward from the upper surface of the upper part 751, and the upper coupling protrusion 755 is coupled to the body coupling portion 725 at the lower surface of the extension 72, and thus the upper portion of the grip member 75 may be fixed.

The front end of the upper part 751 may be in close contact with the outer surface of the outer container 11. In other words, the front end of the upper part 751 may be recessed into a curved surface shape corresponding to the curvature of the outer container 11. Therefore, in a state where the grip member 75 is coupled to the handle body 71, the front end of the upper part 751 may be completely in close contact with the outer container 11.

The lower part 752 is bent downward from an extended end portion of the upper part 751 and may be formed in a shape corresponding to the deco member mounting portion 731. The inner surface of the lower part 752 may be formed to be rounded, thus forming a recessed space 753a so that the protruding portion of the deco member mounting portion 731 is received inside the lower part 752.

The lower coupling protrusion 756 may be formed inside the recessed space 753a. The lower coupling protrusion 756 may be coupled with the grip coupling portion 732a. A pair of lower coupling protrusions 756 may be formed in a hook-like shape to be press-fitted into and coupled to the grip coupling portion 732a.

Meanwhile, a support protrusion 757 may be formed inside the recessed space 753a. A plurality of support protrusions 757 may be formed along the inner side of the lower part 752. For example, the support protrusion 757 may be further provided between the upper end and the lower end of the upper part 751 and the upper end and the lower end of the lower part 752. The support protrusion 757 is in contact with the outer surface of the grip member mounting portion 732. Therefore, even if the user wraps their hand around the grip portion 73 in a state where the grip member 75 is mounted on the grip member mounting portion 732, the grip member 75 does not dropped off or is deformed.

In addition, the stepped portion 753 may be formed on the lower end of the grip member 75. The stepped portion 753 is inserted into the deco hole 763 formed in the deco member 76 together with the lower end of the grip portion 73 so that it is possible to make the grip member 75 more secure.

Lower part borders 754 may be formed at both side ends of the lower part 752. The lower part borders 754 may be formed along both side ends of the deco member 77, and the lower part borders 754 may be supported by the grip stepped portion 733. In addition, the lower part borders 754 may be in contact with the end portion of the deco member 76, and, in a state where the deco member 77 and the grip member 75 are mounted, the deco member 77 and the grip member 75 are in contact with each other in the same plane so that the outer appearance of the handle 70 can be to have a sense of unity.

The deco member 77 may form the outer appearance of the handle 70 by shielding the rest of the handle 70 except for the portion shielded by the grip member 75. The deco member 77 may be formed to have the same texture as the outer case 31. For example, the deco member 77 may be made of the same metal plate material as the outer case 31.

The deco member 77 may include an extension deco 74 that shields the extension 72 and a grip portion deco 76 that shields the grip portion 73. The extension deco 74 and the grip portion deco 76 may be in contact with each other and form the outer appearance of the outside of the handle 70.

The extension deco 74 may include an upper surface portion 741 formed to correspond to the upper surface shape of the extension 72 and a circumferential portion 742 formed to a shape corresponding to the circumferential surface of the extension 72.

The upper end of the circumferential portion 742 may be joined to the circumference of the upper surface portion 741 by welding or the like, or may be stamped from a single material. Accordingly, the extension deco 74 forms the receiving space 743 with the lower surface and the front surface open, and the extension 72 may be inserted into the receiving space 743. At this time, the upper surface portion 741 may be supported in contact with the upper surface of the extension 72, and the circumferential portion 742 may be supported in contact with the circumferential surface of the extension 72.

The front end of the extension deco 74 is formed to be rounded to correspond to the curvature of the outer surface of the outer container 11 and may be recessed. Therefore, the front end of the upper surface portion 741 and the front end of the circumferential portion 742 may be completely in close contact with the outer container 11 when the extension deco 74 is mounted. Accordingly, when the handle 70 is lifted, a load applied from the handle 70 to the outer container 11 may be supported by the front end of the extension deco 74 made of a metal material, for example, and thus it is possible to provide a more robust handle 70 structure.

Meanwhile, the lower end of the circumferential portion 742 may extend to the lower surface of the extension 72. Accordingly, when the grip member 75 is mounted, the upper part 751 may be coupled with the circumference of the opened lower surface of the extension deco 74. Accordingly, the extension 72 can be completely covered by the extension deco 74 and the upper part 751.

The grip portion deco 76 may be mounted on the deco member mounting portion 731. The grip portion deco 76 is in contact with the lower end of the extension deco 74, and in a state where the extension deco 74 and the grip portion deco 76 are mounted, the grip portion deco 76 and the extension deco 74 may appear to be integrally formed. To this end, the grip portion deco 76 may be formed of the same material as the extension deco 74.

The grip portion deco 76 may be formed from a plate-shaped material and may be roundly bent to surround the outer circumferential surface of the deco member mounting portion 731. The remaining portion of the grip portion 73 that is not covered by the grip member 75 may be covered by the grip portion deco 76.

Meanwhile, a constraining portion 762 may be formed at a lower end of the grip portion deco 76. The constraining portion 762 extends from both sides of the lower end of the grip portion deco 76 and may be formed to wrap around the lower end of the grip portion 73 and the lower end of the grip member 75. The constraining portion 762 may be formed in a ring shape with the extended ends contacting each other, and thus the deco hole 763 may be formed therein.

In a state where the grip member 75 is mounted on the grip portion 73, the lower end 736 of the grip portion 73 and the stepped portion 753 may be inserted into the deco hole 763. Therefore, the grip member 75 and the deco member 77 on the grip portion 73 can maintain a fixed state with each other.

At this time, the lower end 736 of the grip portion 73 may include a first lower end portion 736a which is in contact with the inner surface of the deco member 77 and a second lower end portion 736b which is in close contact with the inner surface of the grip member 75. When the deco member 77 is mounted, a circumference of the stepped portion 753 and the first lower end portion 736a may be inserted inside the deco hole 763.

The deco member 77 is in close contact with the deco member mounting portion 731 and may be adhered to the deco member 77 by an adhesive or an adhesive sheet.

Hereinafter, with reference to the drawings, a process of detaching and attaching the container 10 from and to the blender 1 having the above structure will be described in more detail.

Figure 12:
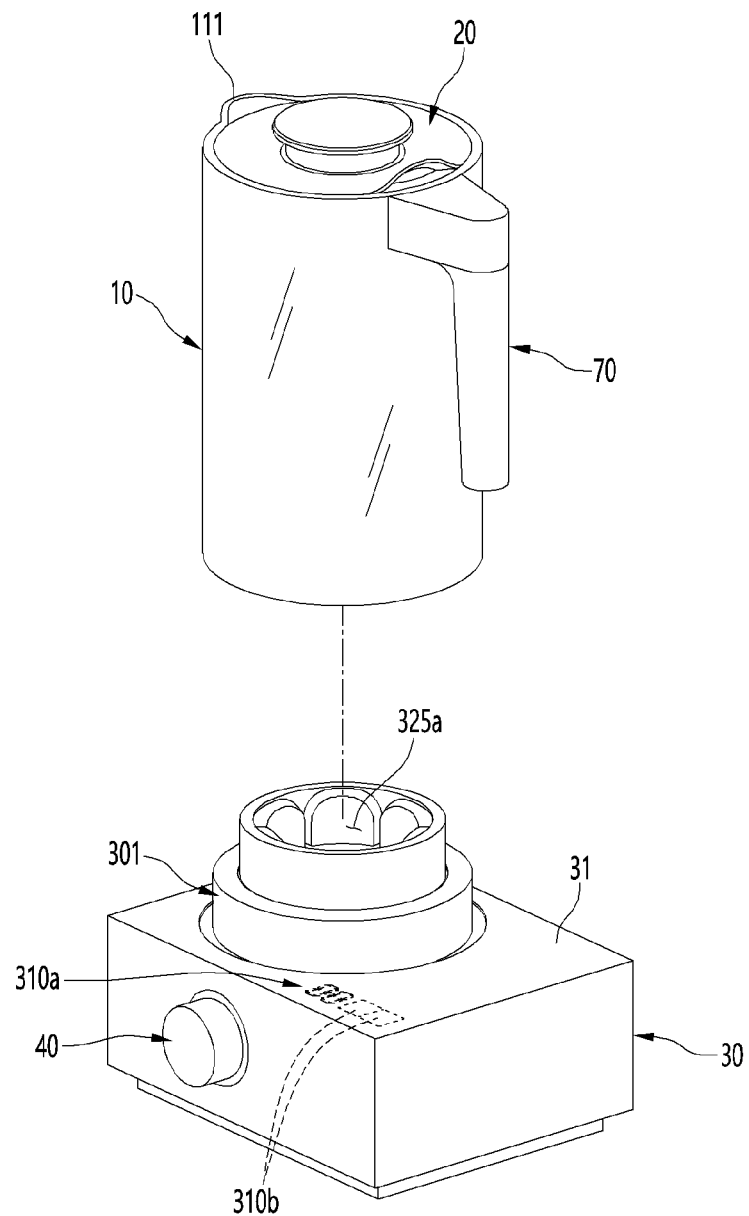
FIG. 12 is an exploded perspective view illustrating a state where the main body and the container are separated.

FIG. 12 is an exploded perspective view illustrating a state where the main body and the container are separated.

As illustrated in the drawing, for the use of the blender 1, the container 10 can be detached and attached from and to the main body 30, and for detachment and attachment of the container 10, the user can hold the handle 70 and lift the handle upward or seat the handle on the container seating portion 301.

As illustrated in FIG. 1, in a state where the container 10 is seated on the main body 30, although the container seating portion 301 and the container 10 are positioned at a slightly eccentric position from the center of the main body 3, the outer end of the handle 70 can be disposed on the same extension line as one side surface of the main body 30, thereby providing a stable and balanced outer appearance as a whole.

In particular, so as to have the same texture as the outer case 31 forming the outer appearance of the main body 30, by having the structure in which the deco member 77 is provided on the handle 70, the container 10 and the main body 30 are in harmony.

Meanwhile, the user separates the container 10 from the container seating portion 301 as illustrated in FIG. 12 for pouring food inside the container 10 or washing the container 10 or the like. To this end, the user holds the handle 70 and lifts the handle 70 upward.

At this time, a portion of the handle 70 which is wrapped by a user's hand is provided with a grip member 75, so that the user can lift or move the container 10 without sliding off the user's hand even if the container 10 becomes heavy. In addition, during the process of lifting the handle 70, a load may be concentrated on a connecting portion between the handle 70 and the outer container 11.

However, the handle body 71 is integrally formed with the outer container 11, and by the reinforcement structure of the handle body 71 and the support of the metal deco member 77 and the grip member 75, a stable state is maintained, and the shape of the handle 70 is maintained even in a situation where a load is concentrated.

After completing the work, the user can hold the handle 70 and seat the container 10 on the container seating portion 301. In addition, in a state where the container 10 is seated, the user can operate the blender 1.

Meanwhile, as the blender container 10 according to the present disclosure, various other embodiments will be possible in addition to the above-described embodiment.

Hereinafter, a blender container according to a second embodiment of the present disclosure will be described with reference to the drawings. Since the blender container according to the second embodiment of the present disclosure has the same configuration as the above-described embodiment except for the handle structure, the same configuration will be described using the same reference numerals to prevent duplication of the description and detailed description thereof may be omitted.

Figure 13:
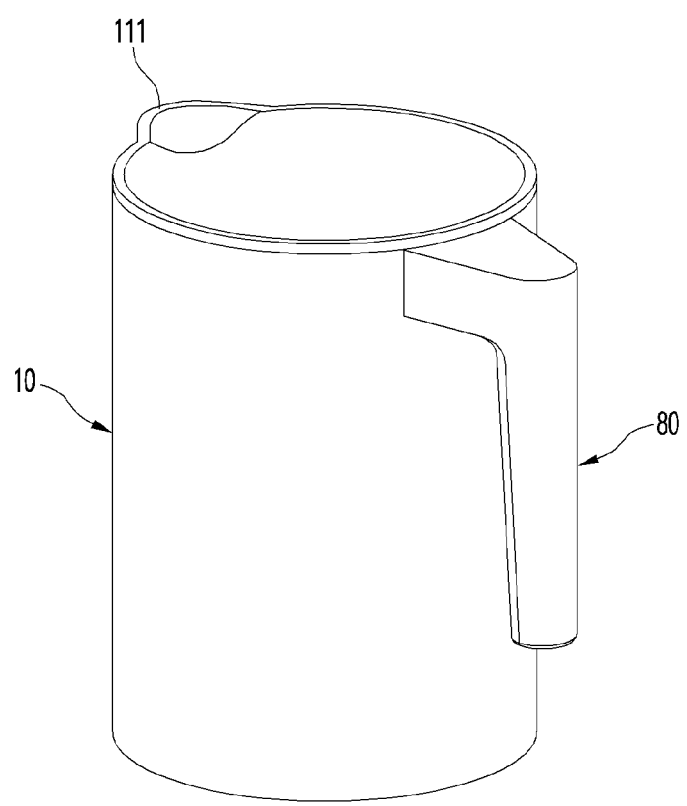
FIG. 13 is a perspective view illustrating a container according to a second embodiment of the present disclosure.
Figure 14:
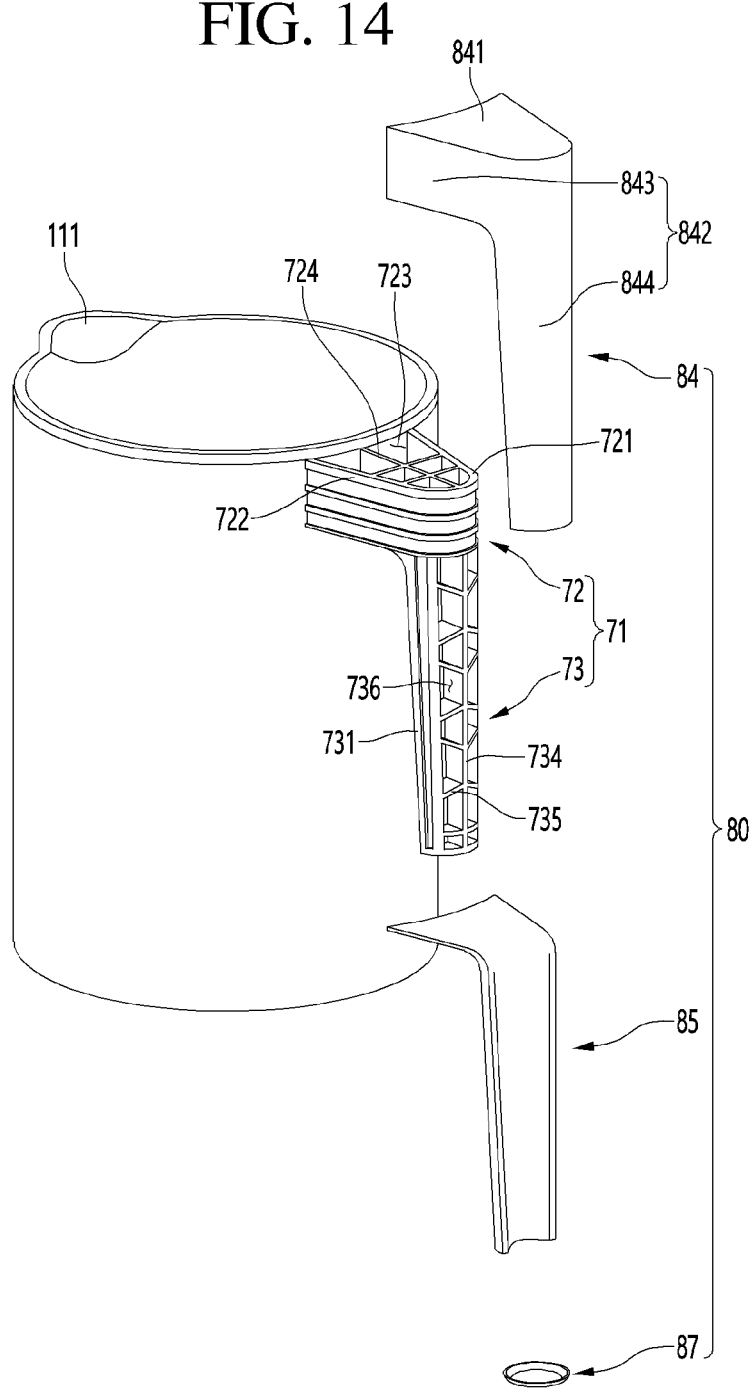
FIG. 14 is an exploded perspective view illustrating the coupling structure of the handle of the container as viewed from above.
Figure 15:
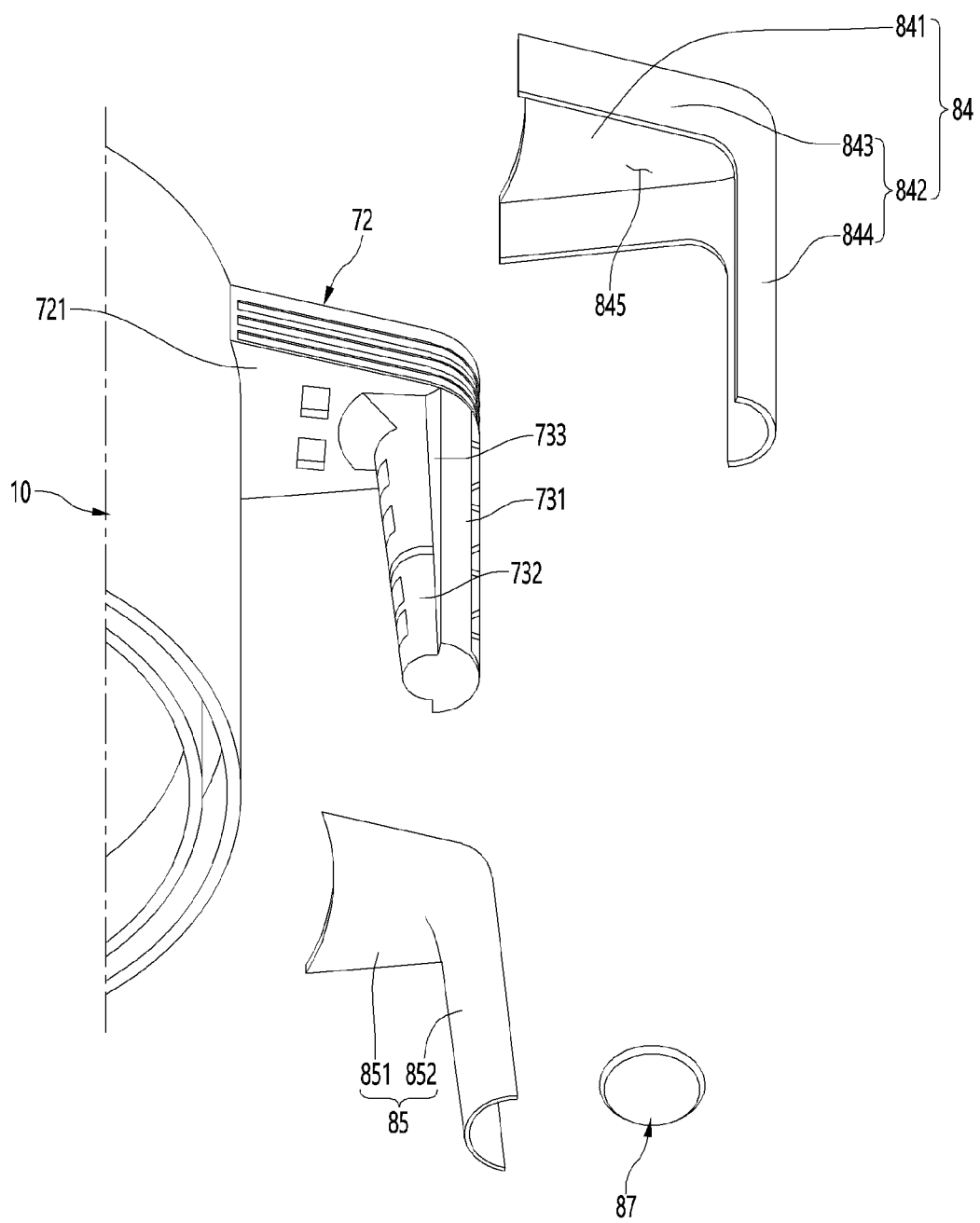
FIG. 15 is an exploded perspective view illustrating the coupling structure of the handle viewed from below.

FIG. 13 is a perspective view illustrating a container according to a second embodiment of the present disclosure, FIG. 14 is an exploded perspective view illustrating the coupling structure of the handle of the container as viewed from above, and FIG. 15 is an exploded perspective view illustrating the coupling structure of the handle viewed from below.

As illustrated, the container 10 of the blender 1 according to the second embodiment of the present disclosure is formed by the coupling of the inner container 12 and the outer container 11, and a handle 80 protruding outward may be formed on the upper end of the container 10.

The handle 80 may include a handle body 71 formed integrally with the outer container 11 and a grip member 85 and a deco member 84 coupled to the handle body 71.

In detail, the handle body 71 may be formed in the same or similar manner as the handle body 71 structure of the above-described embodiment. For instance, the handle body 71 may be molded together when the outer container 11 is molded and may be integrally formed with the outer container 11.

The handle body 71 may be composed of an extension 72 and a grip portion 73.

The extension 72 may include an extension body 721 protruding outward from the upper end of the outer container 11, and an extension space 723 of which an upper surface is opened may be formed on the extension body 721. In addition, a plurality of extension reinforcement ribs 724 may be formed inside the extension space 723. In addition, a plurality of extension grooves 722 may be formed on the outer surface of the extension 72.

The grip portion 73 may extend downward from an extended end portion of the extension 72, the deco member mounting portion 731 on which the deco member 84 is mounted, and the grip member mounting portion 732 on which the grip member 85 is mounted may be formed thereon. A grip stepped portion 733 is formed on both sides of the grip portion 73, and the grip member mounting portion 732 is formed on a side close to the outer container 11 and the deco member mounting portion 731 may be formed on the far side from the outer container 11, based on the grip stepped portion 733.

The deco member mounting portion 731 may have a grip portion space 736 that is open to the outside. In addition, in the center of the grip portion space 736, a center rib 734 partitioning the grip portion space 736 into both sides in the left and right direction is provided. In addition, a plurality of side ribs 735 may be provided at regular intervals in the vertical direction in spaces on both sides partitioned by the center rib 734.

The grip member 85 may be mounted on the grip member mounting portion 732. The grip member 85 may be made of a material having a high friction force when the user holds the grip member by hand. For example, the grip member 85 may be formed of a synthetic resin, rubber or silicone material. The grip member 85 may be mounted in close contact with the lower surface of the extension 72 and the grip member mounting portion 732, respectively. In addition, the grip member 85 may be provided with an adhesive or an adhesive sheet so that the grip member can be securely and fixedly mounted to the handle body 71.

The grip member 85 may be composed of an upper part 851 and a lower part 852. The upper part 851 is in close contact with the lower surface of the extension 72, and the front end of the upper part 851 may be in contact with the outer surface of the outer container 11. In addition, the lower part 852 may extend from an end portion of the upper part 851 to a lower end of the grip portion 73. The lower part 852 may be formed to completely cover the grip member mounting portion 732. In addition, the grip member 85 may be made of a material having elasticity to form a part of the outer appearance of the handle 80 while wrapping the curved surface of the grip member mounting portion 732.

The deco member 84 may form an outer appearance by shielding the rest of the handle body 71 which is shielded by the grip member 85. The deco member 84 may be made of a material having the same metal or metal texture as the outer case 31.

The deco member 84 may be made by a coupling of plate-shaped metal materials or stamping of a metal material and may include an upper surface portion 841 forming an upper surface and a circumferential portion 842 extending downward from the upper surface portion 841. The upper surface portion 841 may be formed in a shape corresponding to the upper surface of the extension 72. In addition, the circumferential portion 842 may extend downward along the outer circumference of the upper surface portion 841. Space 845 in which the handle body 71 is received may be formed inside the deco member 84 by the upper surface portion 841 and the circumferential portion 842.

The circumferential portion 842 may include an upper deco portion 843 shielding the circumferential surface of the extension 72 and a lower deco portion 844 extending downward from the upper deco portion 843. The lower deco portion 844 may be formed to shield the deco member mounting portion 731 and may be formed in a shape corresponding to the grip portion 73.

Accordingly, the handle body 71 can be inserted into the deco member 84 by mounting the deco member 84. In other words, the upper surface of the handle body 71 and a portion of the grip portion 73 are shielded at once to form the outer appearance of the handle 80. Further, the deco member 84 may be securely adhered to the handle body 71 by an adhesive or an adhesive sheet.

In addition, in a state where the grip member 85 and the deco member 84 are mounted, the lower end of the circumferential portion 842 of the deco member 84 is in contact with the outer end of the grip member 85 and shields the handle body 71.

Meanwhile, a handle cap 87 may be formed on the lower surface of the grip portion 73. The handle cap 87 may be formed of the same material as the deco member 84. In addition, the handle cap 87 may be formed to shield all lower ends of the grip portion 73, the handle body 71, and the deco member 84.

The blender container according to the present disclosure will be possible in various other embodiments in addition to the above-described embodiment.

Hereinafter, a blender container according to a third embodiment of the present disclosure will be described with reference to the drawings. Since the blender container according to the third embodiment of the present disclosure has the same or similar configuration as the above-described embodiments except for the handle structure, the same or similar configuration may be described using the same reference numerals to prevent duplication of the description and detailed description thereof may be omitted.

Figure 16:
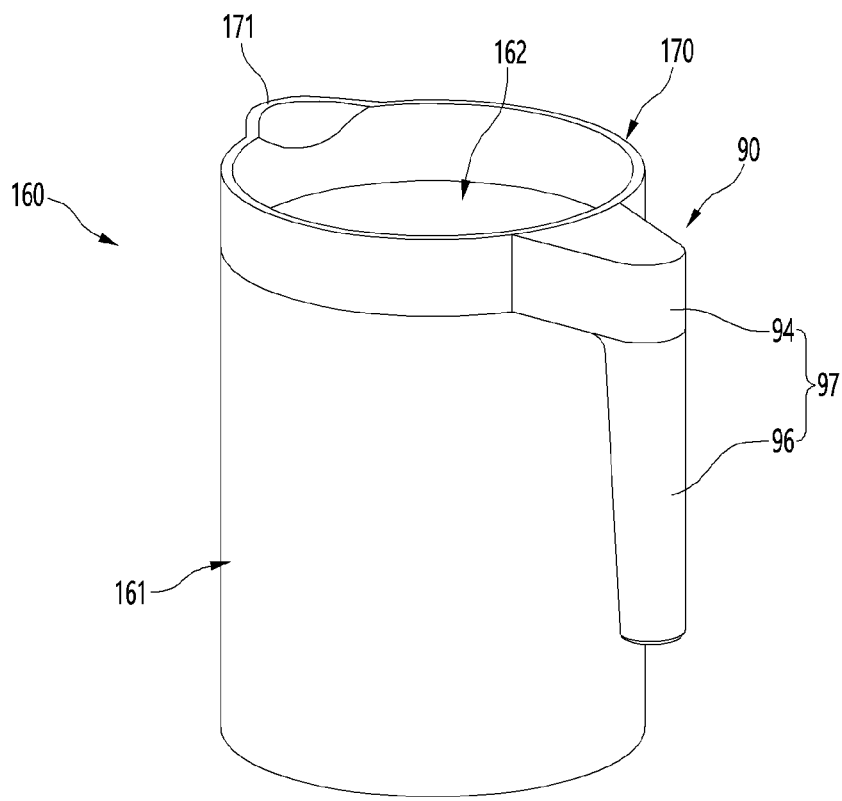
FIG. 16 is a perspective view illustrating a container according to a third embodiment of the present disclosure.
Figure 17:
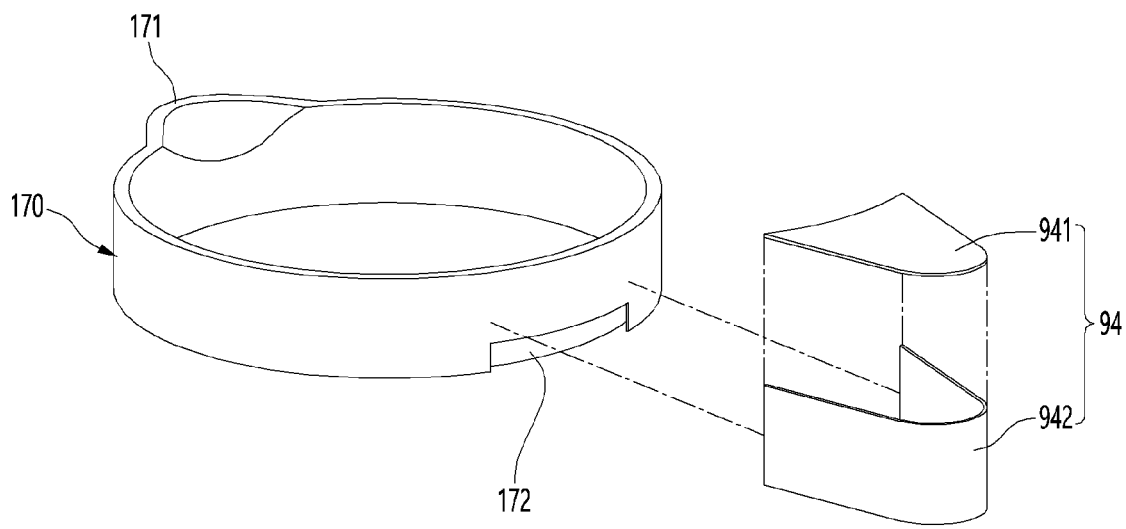
FIG. 17 is an exploded perspective view illustrating a coupling structure between the upper portion and the extension deco of the container.
Figure 18:
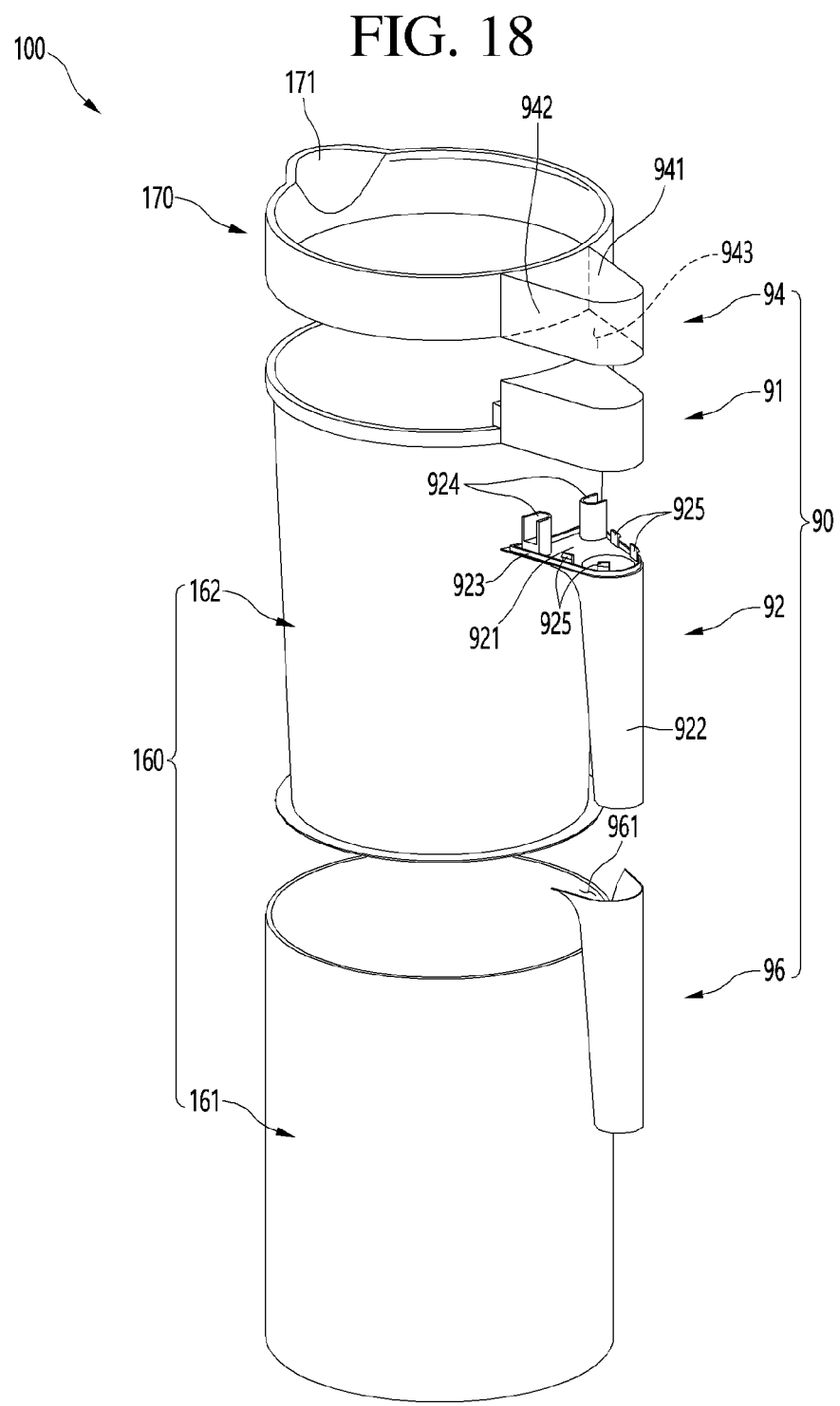
FIG. 18 is an exploded perspective view illustrating the coupling structure of the handle of the container as viewed from above.
Figure 19:
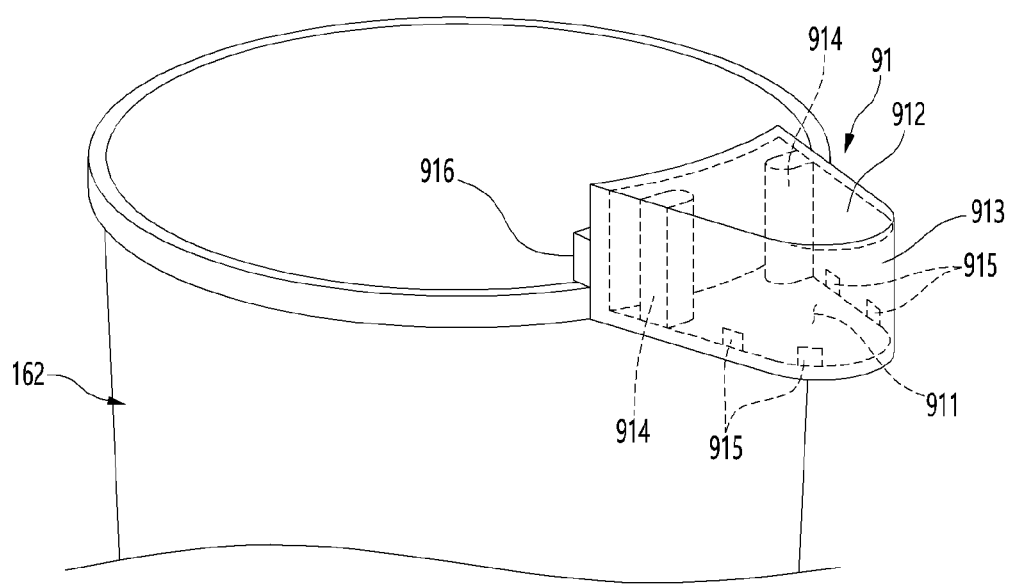
FIG. 19 is a partial perspective view illustrating a structure of a handle body which is one component of the handle.

FIG. 16 is a perspective view illustrating a container according to a third embodiment of the present disclosure, FIG. 17 is an exploded perspective view illustrating a coupling structure between the upper portion and the extension deco of the container, FIG. 18 is an exploded perspective view illustrating the coupling structure of the handle of the container as viewed from above, and FIG. 19 is a partial perspective view illustrating a structure of a handle body which is one component of the handle.

As illustrated in the drawings, the blender container 160 according to the third embodiment of the present disclosure may include an inner container 162, an outer container 161, an upper ring 170, and a handle 90.

The outer container 161 may be formed in a cylindrical shape to form the outer shape of the container 160, and the inner container 162 may be inserted through the opened upper surface. In other words, the container 160 may have a double-walled structure to have thermal insulation performance and may have a more stable and robust container structure. The outer container 161 and the inner container 162 may be made of a transparent material. For example, the outer container 161 and the inner container 162 may be made of a tritan material.

The upper end and the lower end of the inner container 162 may be in contact with the upper end and the lower end of the outer container 161 to form a double wall structure. In addition, a handle body 91 constituting the handle 90 may protrude from an upper end of the inner container 162. The handle body 91 may protrude upward from the upper end of the inner container 162 and, at the same time, may be formed to protrude outward of the outer container 161.

At this time, the protruding height of the handle body 91 may be formed to correspond to the height of the upper ring 170. In addition, the handle body 91 may be formed to be inserted into an extension deco 94 to be described below. The structure of the handle body 91 will be described in more detail below.

The upper ring 170 may be coupled to the upper ends of the inner container 162 and the outer container 161. The upper ring 170 forms an upper end of the container 160 and may be made of a metal material such as in the outer case 31. In addition, the upper ring may be formed in a ring shape having a predetermined height.

On one side end of the upper ring 170, a spout 171 is formed to protrude outwardly to easily pour the crushed food inside the container. In addition, an extension deco 94 may be coupled to the other side of the upper ring 170 facing the spout 171.

The extension deco 94 is configured to receive the handle body 91 as a portion of the deco member 97. The extension deco 94 may be made of a metal material corresponding to the upper ring 170 and may be configured to receive the handle body 91.

The extension deco 94 may include an upper surface portion 941 forming an upper surface and a circumferential portion 942 formed along a circumference of the upper surface portion 941. The upper surface portion 941 and the circumferential portion 942 may be coupled by welding or the like, or by stamping from a single material and by the coupling of the upper surface portion 941 and the circumferential portion 942, the extension deco 94 may form a receiving space 943 having opened lower surface and front surface. Then, the handle body 91 may be inserted into the receiving space 943.

The front end of the extension deco 94 may be coupled to the outer circumference of the upper ring 170 by welding or the like. In addition, the opened front surface of the extension deco 94 may be shielded by the outer surface of the upper ring 170. In other words, the height of the extension deco 94 may be formed to be the same as the height of the upper ring 170. In addition, if the handle body 91 is inserted through the opened lower surface of the extension deco 94, the handle 90 may appear to extend from the upper ring 170.

In addition, a body fixing groove 172 may be formed at a position corresponding to the extension deco 94 among the outer surfaces of the upper ring 170. The body fixing groove 172 is for inserting the body fixing protrusion 916 protruding from the handle body 91 and may be stepped at a lower end of the upper ring 170.

The body fixing groove 172 and the body fixing protrusion 916 may be formed to correspond to the width of the handle body 91. In addition, when the handle body 91 is inserted into the extension deco 94, the body fixing protrusion 916 may be coupled to the body fixing groove 172. Due to this structure, the handle body 91 may have a constrained structure with the upper ring 170, so a portion of the load generated by the handle 90 is also distributed to the upper ring 170, and thus the handle having a structure protruding upward may be fixed more securely.

Meanwhile, the handle body 91 may protrude outward from the upper end of the inner container 162. The handle body 91 may be formed in a shape corresponding to the extension deco 94, and, in a state where the handle body is inserted into the extension deco 94, an upper surface and a circumferential surface of the hand body 91 may be supported by the extension deco 94 and the front surface thereof may be supported on the outer surface of the upper ring 170.

The handle body 91 may be formed in a shape in which the lower surface is opened, and a body space 911 may be formed therein. In addition, the opened lower surface of the handle body 91 may be shielded by the grip member 92.

In addition, inside the body space 911, the body insertion portion 914 for fixedly mounting of the grip member 92 and a hook groove 915 may be formed.

The body inserting portion 914 is formed on both sides of the front surface close to the outer container 161 and is opened downward so that a grip boss 924 to be described below can be inserted. The body inserting portion 914 is formed to extend from the inner upper surface to the lower surface of the handle body 91 and is formed to be in contact with the inner circumferential surface of the handle body 91 to provide a solid fixing structure. In addition, the grip boss 924 may be inserted into the body inserting portion 914 on both sides thereof so that the grip member 92 is securely fixed to the handle body 91.

The hook groove 915 may be formed around the inner surface of the handle body 91. The hook groove 915 may be formed at the opened lower end of the body space 911, and a plurality of hook grooves 92 are provided on both sides facing each other, so that the grip member 92 is more securely and fixedly mounted on the handle body 91.

The grip member 92 may include an upper part 921 which shields the opened lower surface of the handle body 91 and a lower part 922 which extends downward from an end portion of the upper part 921 to be wrapped by a user's hand.

The upper part 921 may be formed in a shape corresponding to the opened lower surface of the handle body 91 and may be formed to be in contact with the circumference of the opened lower surface of the extension deco 94. In other words, when the grip member 92 is mounted on the handle body 91, the upper part 921 may shield both the opened lower surface of the handle body 91 and the opened lower surface of the extension deco 94.

Around the upper part 921, an upper part rib 923 extending upward is formed, and the upper part rib 923 is inserted into the handle body 91 to support the inner surface of the handle body 91.

A pair of grip bosses 924 may be formed on both sides of the upper part 921. The grip boss 924 is formed in a shape that can be inserted inside the body insertion portion 914 and may be formed to extend upward from the upper part 921. In addition, the grip boss 924 may be opened to the lower surface of the upper part, and a screw may be fastened through the grip boss to more securely fix the grip member 92 to the handle body 91.

Fastening hooks 925 may be formed on both sides of the upper part 921. A plurality of fastening hooks 925 may be formed along the circumference of the upper part 921 and may be locked to the hook grooves 915 to enable fixing of the grip member 92.

The lower part 922 may extend downward at a position corresponding to an extended end of the upper part 921, that is, an end portion of the extension deco 94. The lower part 922 is a portion which is held by a user's hand, may be formed to have a circular cross-section, and may be extended downward to a predetermined length. At this time, the cross-section of the lower part 922 may be formed to be smaller going towards the downward direction.

Meanwhile, the lower part 922 is a portion which is substantially held by a user's hand and manipulated and may be made of a material having a large frictional force to prevent the user's hand from slipping. Of course, the lower part 922 is made of a plastic material and may structurally increase friction by surface treatment, coating, film attachment, and/or pattern formation on a portion which is touched by a user's hand.

The deco member 97 forms a portion of the outer appearance of the handle 90 and may be made of the same material or a material having the same texture as the outer case 31. The deco member 97 may be formed to shield a portion of the handle body 91 and the grip member 92, and the outer appearance of the rest of the handle 90 is formed, except for a portion of the grip member 92 facing the outer container 161.

The deco member 97 may include the extension deco 94 and the grip portion deco 96.

The extension deco 94 may be mounted on the upper ring 170 and protrude outward. In addition, the extension deco 94 may include an upper surface portion 941 which is in contact with an upper surface of the handle body 91 and a circumferential portion 942 which is in contact with a circumferential surface of the handle body 91.

The grip portion deco 96 may be formed separately from the extension deco 94 and may be formed to wrap the lower part 922. The upper end of the grip portion deco 96 is in contact with the lower end of the extension deco 94, and thus the grip portion deco 96 and the extension deco 94 may appear to be integrally formed.

In addition, the grip portion deco 96 may be formed with a cut portion 961 partially cut towards the outer container 161. Accordingly, if the grip portion deco 96 is mounted on the lower part 922, the lower part 922 may be exposed through the cut portion 961. In addition, when the user holds the handle 90, the lower part 922 exposed can be held.

Meanwhile, a blender container according to an embodiment of the present disclosure may include an inner container of which an upper surface is opened and which forms a space in which food is received, an outer container receiving the inner container and forming an outer appearance of the inner container, a blade device mounted to penetrate bottoms of the outer container and the inner container and including a plurality of blades configured to crush food by rotation, and a handle extending in a vertical direction and having an upper end which is connected to the outer container and a lower end which is spaced apart from the outer container, in which the handle may include a handle body formed integrally with the outer container and protruding outward from an upper end of the outer container, a grip member coupled to the handle body and wrapped with a user's hand, and a deco member covering a portion of the handle body and forming an outer appearance of the handle.

The outer container may be made of plastic material and is integrally formed together with the handle body by injection molding.

The grip member may be made of a different material from the handle body and the deco member.

The grip member may be made of rubber or synthetic resin material.

The grip member may be formed with a pattern for preventing slipping.

The deco member may be made of a metal material.

The handle body may include an extension extending from the upper end of the outer container in an outer direction, and a grip portion extending downward from an extended end portion of the extension and held by a user.

The extension may include an extension body forming an extension space therein, and a plurality of extension reinforcement ribs disposed to partition the extension space.

The extension body may be formed to have a narrower width as the extension body extends from the outer container.

A plurality of extension grooves formed along the circumferential surface may be formed on the extension body.

The grip portion may include a grip member mounting portion which is formed at a position facing the outer container and on which the grip member is mounted, and a deco member mounting portion which is formed on an opposite side of the grip member mounting portion and on which the deco member is mounted.

The blender container may further include a grip stepped portion which extends from upper ends to lower ends of both sides of the grip portion and is formed stepwise so that the grip portion is divided into the grip member mounting portion and the deco member mounting portion.

The grip stepped portion may be formed at the center of both sides of the grip portion.

In a state where the grip member and the deco member are mounted on the grip member mounting portion and the deco member mounting portion, the end portion of the grip member and the end portion of the deco member may be disposed to be in contact with each other in the same plane.

The grip portion may include a deco member mounting portion in which a grip portion space is formed, and a plurality of grip portion reinforcement ribs which partition the grip portion space.

The grip portion reinforcing ribs may include a center rib extending along the center of the grip portion space in the vertical direction and partitions the grip portion space on both sides in the left and right direction, and a plurality of side ribs which extend in a direction intersecting the center rib and partition the grip portion spaces on both sides of the center rib in the left and right direction, in the vertical direction.

End portions of the center rib and the side rib may be formed to support the inner surface of the deco member.

The grip member may include an upper part configured to shield a lower surface of the extension, and a lower part which is bent downward from an end portion of the upper part and configured to shield one side surface of the grip portion.

The upper part may be formed with an upper coupling protrusion coupled to the body coupling portion opened on the lower surface of the extension body, and the lower part may be formed with a lower coupling protrusion coupled to the grip coupling portion opened on the outer surface of the grip part.

The blender container may include a support protrusion which protrudes on the inner surface of the lower part and supports the outer surface of the grip portion.

The upper part and the lower part may be mounted to be in contact with an end portion of the deco member, respectively, to shield the entire circumference of the handle body.

The deco member may include an extension deco of which a lower surface is opened to receive the extension, and a grip portion deco extending downward from the lower end of the extension deco and shields the rest of the grip portion except for the portion which is shielded by the grip member.

The extension deco and the grip portion deco may be molded in a state of being separated from each other and mounted on the extension and the grip portion, respectively.

A stepped portion may be formed at a lower end of the grip member, and the step portion may be inserted into a lower end of the grip portion deco to form a constraining portion configured to constrain the grip member.

A deco hole into which a lower end of the grip portion and a lower end of the grip member may be inserted in a state of being coupled to each other is formed on the lower surface of the constraining portion.

A handle cap which is coupled to the lower end of the deco member and the grip member and forms a lower surface of the handle may be mounted.

The handle cap may be formed of the same material as the deco member.

In addition, a blender container according to an embodiment of the present disclosure may include an inner container of which an upper surface is opened and which forms a space in which food is received, an outer container receiving the inner container and forming an outer appearance of the inner container, a blade device mounted to penetrate bottoms of the outer container and the inner container and including a plurality of blades configured to crush food by rotation, and a handle extending at a position which is spaced apart from the outer container in a vertical direction and having an upper end which is connected to the inner container and a lower end which is spaced apart from the outer container, in which the handle may include a handle body formed integrally with the inner container and protruding outward from an upper end of the inner container through the upper end of the outer case, a grip member coupled to the handle body and wrapped by a user, and a deco member covering a portion of the handle body and forming an outer appearance of the handle.

The grip member may include an upper part which shields an opened lower surface of the handle body and is coupled to the handle body, and a lower part extending downward from an end portion of the upper part and formed to be wrapped with a user's hand.

Inside the handle body, a body inserting portion opened downward may be formed, and on an upper surface of the upper part, a grip boss which protrudes to be inserted inside the body inserting portion, and to which a screw is fastened may be formed.

A hook-shaped fastening hook may be formed around an upper surface of the upper part, and a hook groove that is engaged with the fastening hook may be formed at a lower end of the inner surface of the handle body.

The upper end of the inner container may be formed with an upper end of the blender container and may be formed with an upper ring having the same texture as the deco member.

A body fixing protrusion protruding towards the upper ring from the handle body, and a body fixing groove recessed in the outer surface of the upper ring and receiving the body fixing protrusion may be included.

A spout protruding in the outer direction may be formed on one side of the upper ring facing the body fixing groove.

The handle body may protrude upward more than the upper end of the outer case, and one protruding surface of the handle body may be supported in contact with the outer surface of the upper ring.

The front end of the handle body may be formed to be rounded to correspond to the curvature of the outer surface of the upper ring.

The deco member may include an extension deco which is coupled to the upper ring and is opened downward to receive a handle boss, and a grip portion deco which is in contact with the lower end of the extension deco, and in which the grip member is received.

The extension deco may include a circumferential portion which is formed of a plate-like material made of a metal material, of which both ends are joined to the upper ring, and which is formed to wrap the circumference of the handle body and an upper surface portion which is joined to the upper end of the circumferential portion and the upper ring and is in contact with the upper surface of the handle body.

In the grip portion deco, a portion of the surface facing the outer container may be cut, and a portion of the grip member may be exposed towards the outer container.

The handle body may be formed to be narrower as the handle body protrudes from the inner container.

The grip member may be made of a material having a greater frictional force than the inner container.

In addition, a blender according to an embodiment of the present disclosure may include a main body provided with a motor assembly, a container detachably mounted to the main body, a blade device mounted to penetrate a bottom of the container and rotated in connection with the motor assembly when the container is mounted, a container seating portion provided on an upper surface of the main body and on which the container is seated, and a handle extending in a vertical direction from a position away from the container and having an upper end which is connected to the container and a lower end which is spaced apart from the container, in which the handle may include a handle body formed integrally with an outer surface of the container and protruding from an upper end of the container, a grip member coupled to the handle body and held by a user's hand, and a deco member which covers a portion of the handle body and which forms an outer appearance of the handle.

The container may include an inner container forming a space in which food is received, and an outer container which receives the inner container and forms an outer appearance.

The handle body may include an extension extending from the outer case in the outer direction, and a grip portion extending downward from an extended end portion of the extension and held by the user.

The grip member may be mounted on one side of the grip portion facing the outer container, and the deco member may be mounted to shield the grip portion and the extension except for the grip member.

The deco member may include an extension deco of which the lower surface is opened and in which the extension is received and a grip portion deco which is mounted to wrap the grip portion under the extension deco.

The grip member may include an upper part which shields a lower surface of the extension, and a lower part which is bent downward from the end portion of the upper part and which partially covers the grip portion.

The circumference of the grip member may receive the handle body in contact with the opened lower end of the deco member.

The grip member may be made of a material having a higher frictional force than the outer surface of the container.

The grip member and the deco member may be formed of different materials.

The deco member may be made of the same material as the outer surface of the main body.

The main body may include an outer case which is made of metal material, forms an outer appearance of the main body, and opens a lower surface thereof, and an inner case which is provided inside the outer case and in which the motor assembly is received, and in which the outer case and the deco member may be made of a material having the same texture.

The inner case may be made of a plastic material and may form the container seating portion penetrating the upper surface of the outer case.

The container seating portion may be located at an eccentric position of the main body, and the side end of the handle may be positioned on the same extension line as one side surface of the main body.

In the above description, numerous specific details are set forth in order to provide a thorough understanding of the present disclosure. The present disclosure may be practiced without some or all of these specific details. Examples of various embodiments have been illustrated and described above. It will be understood that the description herein is not intended to limit the claims to the specific embodiments described. On the contrary, it is intended to cover alternatives, modifications, and equivalents as may be included within the spirit and scope of the present disclosure.

What is claimed is:

1. A blender comprising:
a main body provided with a motor assembly;
a container detachably mountable to the main body and of which an upper surface is opened;
a handle having an upper end which is connected to the container and a lower end which is spaced apart from the container,
wherein the handle includes
a handle body formed integrally with the container, and protruding outward from an upper end of the container and extending downward, and the handle body including an extension extending from the upper end of the container in an outward direction, and a grip portion extending downward from an extended end portion of the extension,
a grip member coupled to an outer surface of the handle body, and
a decorative member covering the outer surface of the handle body which is not covered by the grip member and configured to form an outer appearance of the handle,
wherein the decorative member includes
a first decorative part of which a lower surface is opened to receive the extension, and
a second decorative part extending downward from the lower end of the first decorative part and covers the rest of the grip portion except for the portion which is covered by the grip member.

2. The blender of claim 1,
wherein the grip member is made of rubber or synthetic resin material.

3. The blender of claim 1,
wherein the container includes
an inner container forming a space in which food is received, and
an outer container configured to receive the inner container and forming an outer appearance of the container.

4. The blender of claim 3,
wherein the outer container is made of plastic material and is integrally formed together with the handle body by injection molding.

5. The blender of claim 1,
wherein the extension includes
an extension body having an extension space therein, and
a plurality of extension reinforcement ribs disposed to partition the extension space.

6. The blender of claim 1,
wherein the grip portion includes
a grip member mounting portion having a position facing the container and on which the grip member is mounted, and
a decorative member mounting portion which is formed on an opposite side of the grip member mounting portion and on which the decorative member is mounted.

7. The blender of claim 6, further comprising:
a grip stepped portion which extends from upper ends to lower ends of both sides of the grip portion and is formed stepwise so that the grip portion is divided into the grip member mounting portion and the decorative member mounting portion.

8. The blender of claim 6,
wherein the grip member includes
an upper part configured to shield a lower surface of the extension, and
a lower part which is oriented downward from an end portion of the upper part and configured to shield a side surface of the grip portion.

9. The blender of claim 8,
wherein the lower part is mounted to be in contact with an end portion of the decorative member, wherein the grip member and the decorative member shield an entire circumference of the handle body.

10. The blender of claim 1,
wherein the grip portion includes
a decorative member mounting portion having a grip portion space, and
a plurality of grip portion reinforcement ribs which partition the grip portion space.

11. The blender of claim 1,
wherein the first decorative part and the second decorative part are molded in a state of being separated from each other and mounted on the extension and the grip portion, respectively.

12. The blender of claim 1,
wherein a stepped portion is formed at a lower end of the grip member, and
a constraining portion formed at a lower end of the second decorative part so that the step portion is inserted into the constraining portion.

13. The blender of claim 12,
wherein a hole is formed at the constraining portion, and
a lower end of the grip portion and the lower end of the grip member are inserted into the hole in a state of being coupled to each other.

14. The blender of claim 1,
wherein the main body includes
an outer case made of metal material, forming an outer appearance of the main body, and opened at a lower surface thereof, and
an inner case which is provided inside the outer case and in which the motor assembly is received, and
wherein the decorative member is made of a same material as the outer case.

15. The blender of claim 1,
wherein a container seating portion is provided on an upper surface of the main body and on which the container is seated, and the container seating portion is located eccentric from a center of the main body, and
wherein a side end of the handle protrudes to the inside of an extension line of a side end of the main body.

* * * * *